US010952098B2

(12) United States Patent
Syed et al.

(10) Patent No.: US 10,952,098 B2
(45) Date of Patent: Mar. 16, 2021

(54) CAPACITY MANAGEMENT METHODS AND APPARATUS FOR USE IN A CITIZENS BROADBAND RADIO SERVICE NETWORK

(71) Applicant: Charter Communications Operating, LLC, St. Louis, MO (US)

(72) Inventors: Haider Syed, Parker, CO (US); Volkan Sevindik, Parker, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 288 days.

(21) Appl. No.: 16/013,103

(22) Filed: Jun. 20, 2018

(65) Prior Publication Data
US 2019/0394678 A1    Dec. 26, 2019

(51) Int. Cl.
*H04W 28/08*    (2009.01)
*H04L 12/24*    (2006.01)
*H04B 17/318*   (2015.01)
*H04L 5/00*     (2006.01)
*H04W 36/04*    (2009.01)
*H04W 36/16*    (2009.01)
*H04W 28/20*    (2009.01)

(52) U.S. Cl.
CPC .......... *H04W 28/08* (2013.01); *H04B 17/318* (2015.01); *H04L 5/0035* (2013.01); *H04L 41/0896* (2013.01); *H04W 28/20* (2013.01); *H04W 36/04* (2013.01); *H04W 36/165* (2013.01)

(58) Field of Classification Search
CPC ..... H04W 28/08; H04W 28/20; H04W 36/04; H04W 36/165; H04L 41/0896; H04L 5/0035; H04B 17/318
See application file for complete search history.

(56) References Cited

U.S. PATENT DOCUMENTS

| 2003/0236094 | A1* | 12/2003 | Jami ..................... H04W 76/38 455/450 |
| 2011/0183672 | A1* | 7/2011 | Jeong .................... H04W 36/30 455/436 |
| 2012/0329460 | A1* | 12/2012 | Huang ............... H04W 72/0413 455/436 |
| 2015/0351108 | A1* | 12/2015 | Cui ....................... H04L 5/0062 370/329 |
| 2020/0162929 | A1* | 5/2020 | Cimpu ................. H04J 11/0026 |

* cited by examiner

*Primary Examiner* — Walli Z Butt
*Assistant Examiner* — Thad N Defauw
(74) *Attorney, Agent, or Firm* — Straub & Straub; Stephen T. Straub; Michael P. Straub

(57) ABSTRACT

Methods and apparatus for managing capacity in a Citizens Broadband Radio Service (CBRS) network. An exemplary method embodiment includes operating a Citizens Broadband Radio Service Device (CBSD) of a cell to perform the steps of: receiving a power down message; decreasing, in response to the power down message, UE inactivity timer length for one or more UEs from a first length to a second length; and continuing to transmit packets to UEs at an edge of the cell. An exemplary system embodiment includes: a CBSD of a cell that comprises: a network receiver that receives a power down message; a first processor that controls the first CBSD to decrease, in response to the power down message, UE inactivity timer length for one or more UEs from a first length to a second length; and a wireless transmitter that continues to transmit packets to UEs at an edge of the cell.

20 Claims, 16 Drawing Sheets

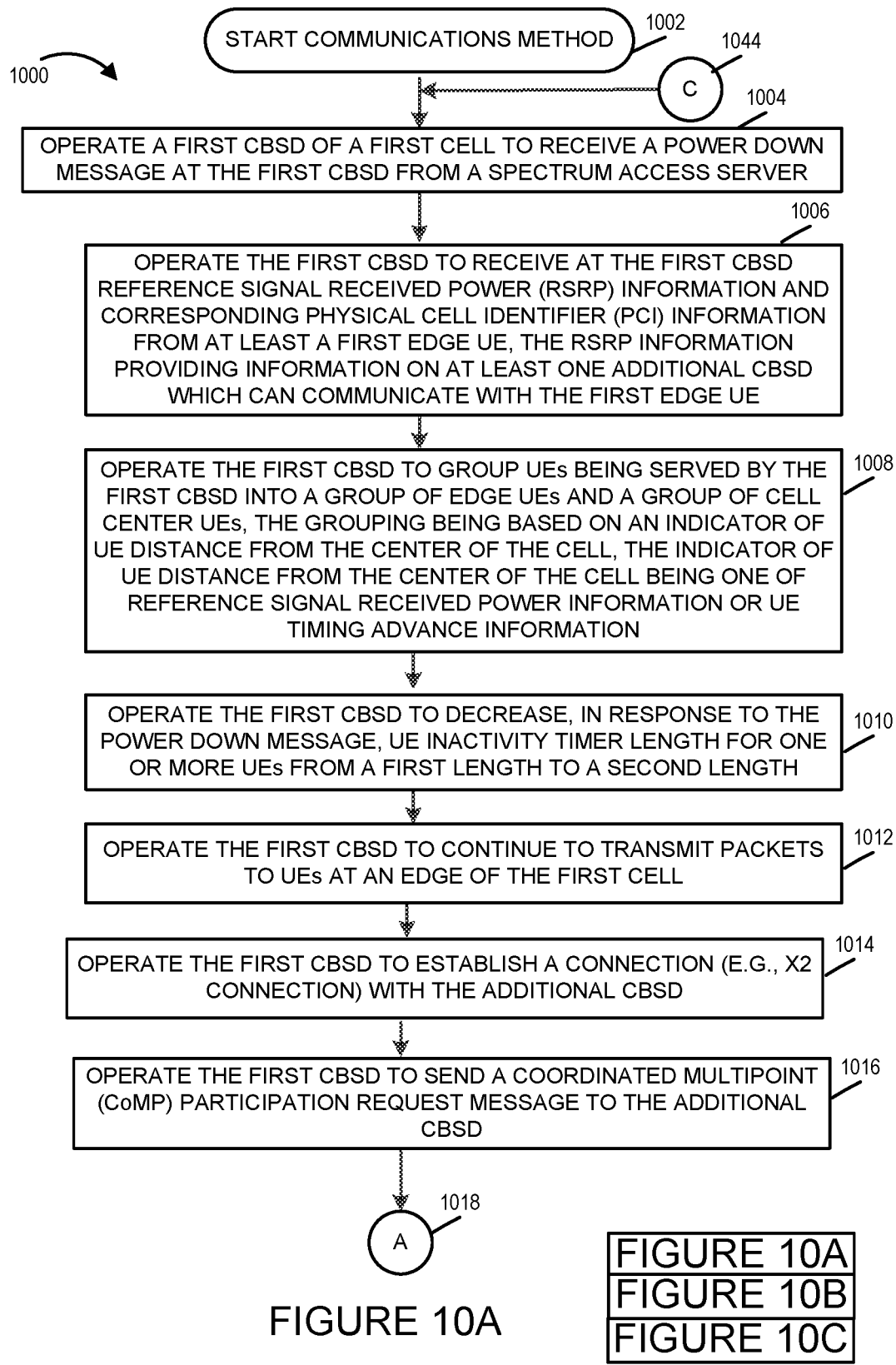

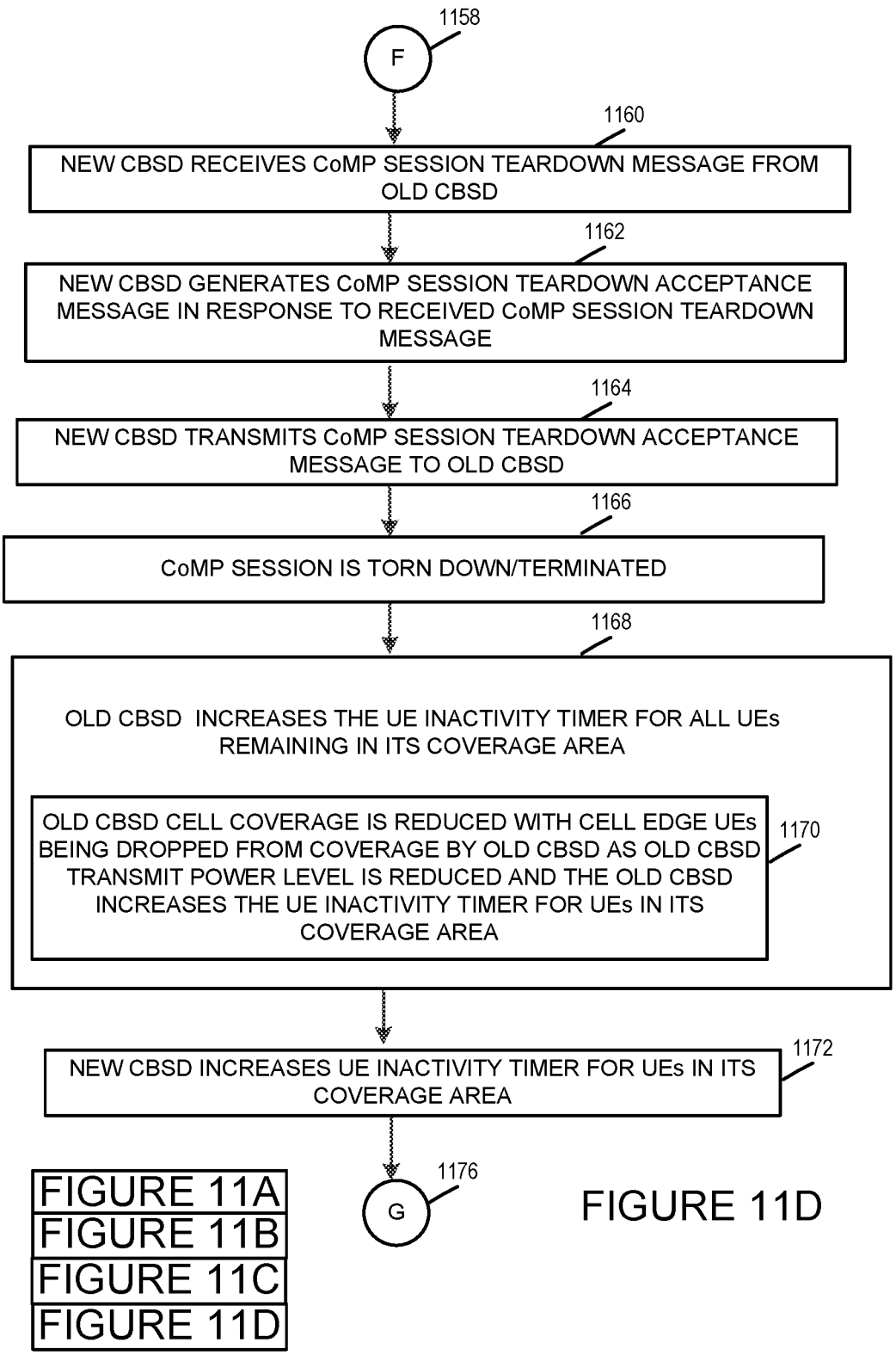

US 10,952,098 B2

CAPACITY MANAGEMENT METHODS AND APPARATUS FOR USE IN A CITIZENS BROADBAND RADIO SERVICE NETWORK

FIELD OF INVENTION

The present invention relates to methods and apparatus for managing capacity in a Citizens Broadband Radio Service (CBRS) network. More particularly, the present invention relates to methods and apparatus for managing the introduction of a new Citizens Broadband Radio Service Device into a system while reducing, minimizing and/or eliminating the impact on current user equipment devices currently receiving services.

BACKGROUND OF THE INVENTION

In a Citizens Broadband Radio Service (CBRS) network, Citizens Broadband Radio Service Devices CBSDs serve as access points which can support communications sessions between a user equipment device (LIE) using a CBSD and another device attached to a Long-Term Evolution (LTE) network with which the UE is communicating. The communications with the UE may involve a communications session which may be and sometimes is a voice, video or data session.

While data sessions may be short lived in some cases, video sessions, as well as some data sessions may normally last for several minutes or even longer.

A CBRS network often includes one or more Citizens Broadband Radio Service Devices (CBSDs) with relatively small coverage areas as compared to a macro base station or access point. In a CBRS network, interference is managed through power management of CBSD devices by a management device in the network referred to as a Spectrum Access System (SAS). When a new CBSD is turned on, the management device will instruct nearby CBSDs transmission power levels to be turned doyen or decreased in order to decrease electromagnetic interference to this newly created/activated device.

A power down operation by a CBSD in response to a power reduction instruction from a management device will result in a reduction in the data capacity and/or transmission range of a CBSD which implements the power down instruction. As a result, the number of UEs which can be supported by a CBSD subject to a power down command will be reduced as compared to before the power down command is implemented. This can result in a disruption of service as a CBSD may no longer be able to service the same number of UEs after a power down command and/or some of the UEs being serviced prior to a power down command may have difficulty communicating at the same data rates or be out of range of the CBSD subject to a power down command.

Thus it should be appreciated that the powering down of an active CBSD due to a new, e.g., neighboring CBSD, being added to a system can disrupt ongoing communications sessions resulting in the possible dropping of the session. Interruption of video sessions, and/or halted and/or low quality video sessions e.g., can be annoying and is often considered a sign of poor service quality. Similarly, even in cases were a session is not dropped the loss of packets, e.g., dropping of packets in a CBSD transmit buffer can be undesirable since it can result in the loss of video packets causing defective video in a video session. In the case of data sessions the loss of packets and/or dropping of the session is also undesirable as data may be lost and/or a new session may need to be established.

Re-establishment of a communications session or establishment of a new communications session due to radio link problems such as those which may occur when a CBSD powers down are not only desirable but can involve a fair amount of session establishment signaling to re-establish a session or establish a new session.

From the above, it should be appreciated that it would be desirable if methods and/or apparatus could be developed which would allow for a CBSD to reduce its transmit power when a new CBSD is added to the system without requiring termination of communications sessions which are ongoing at the CBSD which is controlled to implement the power down operation. For communications sessions which will no longer be supportable as a result of a power down instruction it would still be desirable if a CBSD could complete transmission of packets already included in its transmit buffer so that those sessions for which additional packets will not be received can be completed without loss of packets despite the receipt of a power down instruction.

SUMMARY OF THE INVENTION

Methods and apparatus for managing and utilizing the capacity of CBSDs in a CBRS network, e.g., which uses LTE, are described. CBSDs in the system determine the number of UEs in their coverage area, e.g., the number they are serving. This information provides information on the UE load on the existing CBSDs in the network. The CBSD can use this load information for managing UEs and determining how best to respond to a power down command taking into consideration the effect the power down command will have given the exiting load on the CBSD at the time the power down command, e.g., from an SAS, is to be implemented.

When a new CBSD is added to the network, an SAS determines CBSD transmission power changes to be made to existing CBSDs in the area where the new CBSD has been added. The SAS communicates a power down message, e.g., power down instruction, to an old CBSD to reduce the interference to the new CSBD.

In response to the power down message, the CSBD will begin transmitting in accordance with the new lower transmission power constraints. As a result of the reduction in available power, a CSBD may have difficulty communicating with devices at the edge of the cell if communication with other UEs is maintained at the same rate as before the power down instruction was implemented.

To free up resources on a temporary basis to allow the CBSD being powered down to complete transmission of packets in its transmit buffer for UEs, UEs at the cell edge prior to the power down command, for which communication is not going to be able to be maintained for an extended period of time after the power down operation, the CBSD takes one or more steps to attempt to successfully communicate the packets in its transmit buffer. In one approach the CBSD decreases the inactivity timer for UEs which are likely to continue to be supported by the CBSD after the power down operation, e.g., UEs near the CBSD as indicated by received signal strength, power headroom information and/or timing advance information indicating that a UE is near the CBSD and thus likely to be capable of being supported after the power down command is implemented. By decreasing the UE inactivity timer for UE's near the CBSD, these UEs are likely to be more quickly switched into an idle state than before the power reduction operation since the shorter inactivity time is more likely to be satisfied by even a short period of inactivity. By transitioning at least some UEs into the idle state the transmission resources including power and/or bandwidth previously being used by such UEs is freed up for communicating remaining packets in the CBSD's transmit buffer to UEs at the cell edge which are likely to be dropped after a brief period of time, e.g., a few seconds, due to the reduction in transmission power. While the CBSD may transmit to the cell edge UEs at a lower power level and thus potentially at a lower data rate due to use of a lower modulation order or level because of the reduction in the transmit power level, the CBSD will still be able to empty its transmit buffer of packets directed to the UEs at the cell edge which were present at the time the power reduction instruction was received. In another approach the CBSD reducing its power level may establish an X2 connection with the new CBSD and/or another neighboring CBSD and seek assistance with transmitting the packets in its transmit buffer to the UEs likely to be dropped by the CBSD implementing the transmit power reduction instruction.

Optionally, UEs which are likely to be dropped may be instructed to initiate a handoff to a different CBSD if possible. In this way, UEs which are capable of establishing a new connection with another CBSD, e.g., the new CBSD, may be able to continue ongoing communications sessions via the new CBSD without termination of an ongoing session. In the case of handoff, as part of the normal handoff procedure packets to a UE which attached to a new CBSD will cease being directed to the old CBSD and will be directed to the new CBSD. Thus, a session that is ongoing may be able to continue potentially without the loss of packets despite the radio connection with the old CBSD being terminated shortly after the reduction in transmit power is completed.

Thus in some embodiments the old CBSD in response to the power down message decreases a UE inactivity time for non-edge UEs, e.g., UEs in the cell center and/or area between the cell center and edge of the cell. By decreasing the UE inactivity timer of at least some UEs, the amount of time allocated to the UEs near the CBSD for data transmissions on average is likely to decrease. In this way the CBSD can free up transmission resources, at least on a short term basis, to free up resources to empty the transit buffers corresponding to edge UEs before terminating the radio connection with the cell edge UEs.

In some embodiments the new CBSD like the old CBSD adjacent the new CBSD will use an inactivity timer for at least some UEs which is shorter than that used after the cell has been operating for a period of time and reached a steady state condition, e.g., with handover of UEs from the old cell to the new cell as part of an optional load balancing operation having been completed. The handover is optional in that the methods and apparatus can still be used to empty transmit buffers of the old CBSD before dropping the radio connection with the edge UEs even if no handover is to be implemented.

In order to facilitate making decisions with regard to which UEs are likely to be dropped and/or should be handed off to the new CBSD as part of the load balancing performed as part of the process of adding the new CBSD to the system, the old CBSD signals to the UEs in its service area that they should measure signals from neighbor CBSDs, e.g., received signal strength of pilot or other signals along with the ID, e.g., PCI (physical cell identifier), of the CBSD transmitting the measured received signals. The measurements and PCIs provide an indication to the old CBSD of neighboring cells that can be used to assist in transmitting packets in the CBSD's transmit buffer and also can be used to identify handoff candidates and make handover determinations.

The old CBSD receives the PCI and received signal power information, e.g., Reference Signal Received Power signal (RSRP signal) reported by the UEs in its coverage area and identifies one or more CBSDs which can assist in transmitting remaining packets in the old CBSD's transmit buffer to the UEs at the edge of the cell. In embodiments where handoff is supported and/or possible between the old and new CBSD, or other adjacent CBSDs, the old CBSD subject to the power reduction operation also identifies one or more UEs to handoff to the new CBSD.

To facilitate transmission of remaining packets in it transmit buffer and/or a handoff, in some embodiments an X2 connection is established between the old CBSD and new CBSD to facilitate communication and transmission of packets from the old CBSD and new CBSD.

With the X2 connection established the old CBSD sends a (Coordinated Multipoint) CoMP participation message to the new CBSD. After acceptance of the CoMP participation acceptance message, the old and new CBSD will both transmit packets to the UEs whose connection with the old CBSD will be terminated upon completion of transmission of packets in the old CBSD's transmit buffer.

Once the packets in the old CBSDs buffer have been transmitted to the UE the radio connection between the old CBSD and the UE will be terminated freeing up resources for the old CBSD to use to support communications with the UEs that are in the coverage of the old CBSD. For UEs able to complete a handoff to the new CBSD or another CBSD one or more ongoing communications sessions will be able to continue without being interrupted, e.g., terminated, due to the reduction in transmit power at the old CBSD.

After a brief period the old CBSD will have emptied its transmit buffers for UEs, e.g., UEs at the edge of the cell prior to the reduction in transmit power, which are not going to be supported by the old CBSD on an ongoing basis after the reduction in transmit power and the radio connections with such UEs will be terminated. Once the radio connections with one, more or all of the UEs which are to be dropped have been terminated, the old CBSD changes the inactivity time of the UEs which it is going to continue to support back to the longer normal length used during normal operation and/or ceases the CoMP transmission with the CBSD(s) assisting in emptying the old CBSDs transmit buffers for UEs being dropped.

By using one or more of the techniques described herein the effect on UEs, particularly those at the edge of a cell subject to a power reduction operation when a new CBSD is added, can be minimized or reduced and the chance that a session can be gracefully ended or will be able to continue uninterrupted is increased.

An exemplary method embodiment of present invention includes operating a first CBSD of a first cell, the method comprising the steps of receiving a power down message at the first CBSD; decreasing, in response to the power down message, UE inactivity timer length for one or more UEs from a first length to a second length; and continuing to transmit packets to UEs at an edge of the first cell. In some embodiments, the method further includes operating the first CBSD to group UEs being served by the first CBSD into a group of edge UEs and a group of cell center UEs, said grouping being based on an indicator of UE distance from the center of the cell, said indicator of UE distance from the center of the cell being one of Reference Signal Received power information or UE timing advance information. The step of decreasing UE inactivity timer length in some embodiments is performed for UEs in said cell center group of UEs and is not performed for UEs in said group of edge UEs.

In some method embodiments, the method further includes receiving at said first CBSD RSRP (reference signal received power information) and corresponding physical cell identity (PCI) information from at least a first edge UE, said RSRP information providing information on at least one additional CBSD which can communicate with the first edge UE; operating the first CBSD to send a coordinated multi-point (CoMP) participation request message to the additional CBSD; operating the first CBSD to receive a CoMP request acceptance message indicating that the additional CBSD is willing to assist in the communication of packets; and operating the first CBSD to communicate a first set of packets in its transmit buffer to said additional CBSD via said communications link, said first set of packets being packets for transmission (e.g., to be transmitted) to the first edge UE as part of a CoMP session. Both the first CBSD and said additional CBSD are then operated to transmit the first set of packets over the air. In some embodiments, the first CBSD completes a handover operation of the first edge UE to the additional CBSD after completion of the CoMP session.

The present invention is applicable to apparatus and system embodiments wherein one or more devices implement the steps of the method embodiments. In some apparatus embodiments each of CBDS, user equipment devices, SAS devices and each of the other apparatus/devices of the system include one or more processor and/or hardware circuitry, input/output interfaces including receivers and transmitters, and a memory. The memory including instructions when executed by the processor control the apparatus/device of the system to operate to perform the steps of various method embodiments of the invention.

The present invention is also applicable to and includes apparatus and systems such as for example, apparatus and systems that implement the steps of the method embodiments. For example, an exemplary communications system embodiments comprises: a first CBSD of a first cell, the first CBSD including: a network receiver that receives a power down message; a first processor that controls the first CBSD to decrease, in response to the power down message, UE inactivity timer length for one or more UEs from a first length to a second length; and a wireless transmitter that continues to transmit packets to UEs at an edge of the first cell. In some such communications embodiments, the first processor controls the operation of the first CBSD to group UEs being served by the first CBSD into a group of edge UEs and a group of cell center UEs, said grouping being based on an indicator of UE distance from the center of the cell, said indicator of UE distance from the center of the cell being one of Reference Signal Received power information or UE timing advance information.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

BRIEF DESCRIPTION OF THE DRAWINGS

FIG. 10 illustrates the combination of FIGS. 10A, 10B, and 10C.

FIG. 10A illustrates the steps of the first part of an exemplary communications method in accordance with one embodiment of the present invention.

FIG. 11 illustrates the combination of FIGS. 11A, 11B, 11C and 11D.

FIG. 11D illustrates the steps of the fourth part of an exemplary communications method in accordance with one embodiment of the present invention.

DETAILED DESCRIPTION

Figure 1:
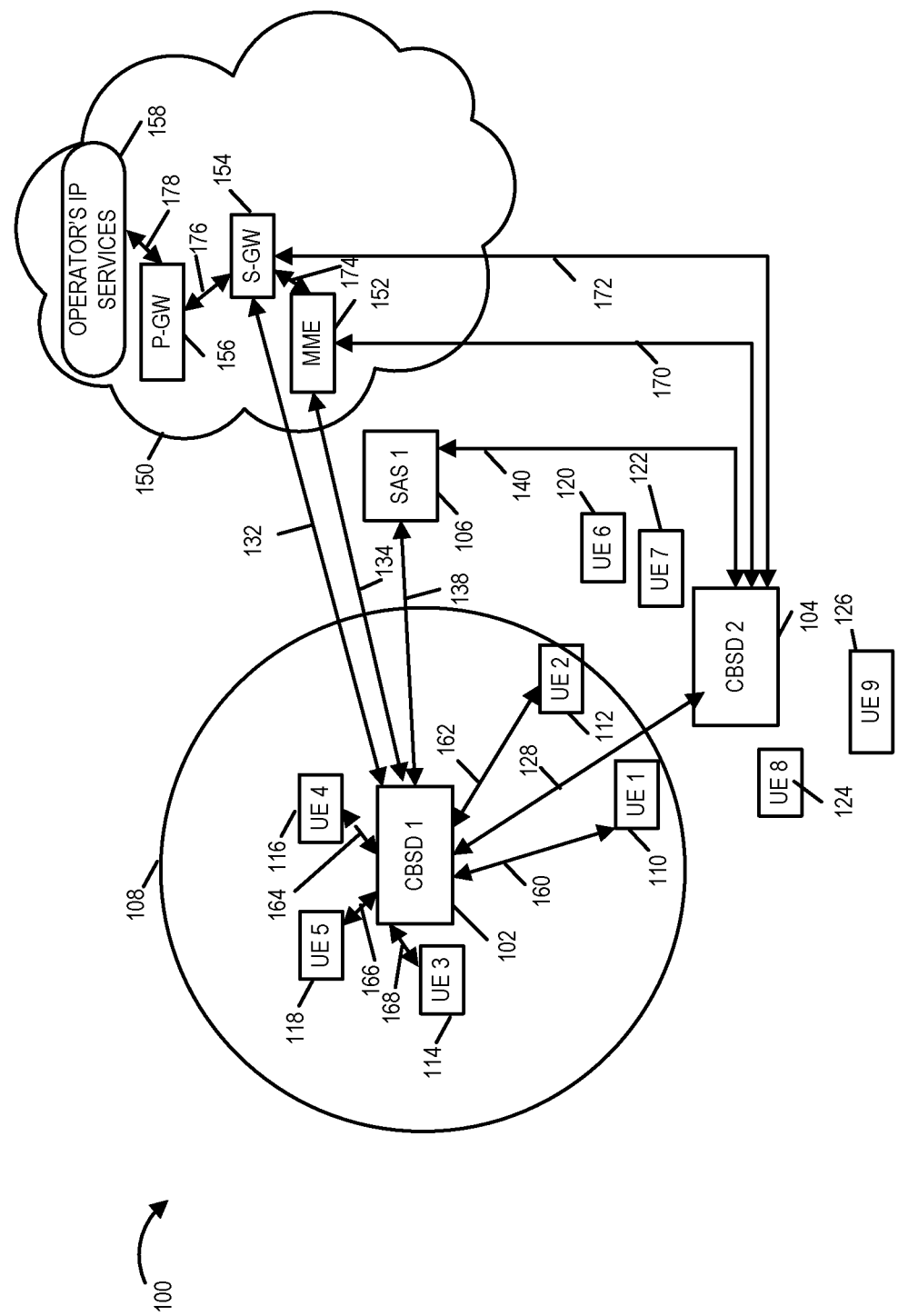
FIG. 1 illustrates an exemplary Citizens Broadband Radio Service network system 100 that provides wireless communications services at a time T1 in accordance one embodiment of the present invention.

The current invention is applicable to Citizens Broadband Radio Service (CBRS) networks that provide wireless communications services. The present invention relates to methods, systems and apparatus to manage capacity and coverage of CBRS networks in a way that minimizes and/or eliminates service disruptions and/or service degradations to user equipment devices when a CBSD device is activated or powered up and begins transmitting in proximity to one or more existing and active CBSD devices.

Citizens Broadband Radio Service networks are networks that include user equipment devices, e.g., mobile or wireless devices such as for example cell phones, smart phones, laptops, tablets, Citizens Broadband Radio Service Devices (CBSDs) which serve as access points/base stations, and Spectrum Access Systems which provides spectrum assignments and manages frequency interference through power management of the CBSDs transmission power. The Citizens Broadband Radio Service network utilizes the 150 megahetz in the 3550-3700 MHz band referred to as the 3.5 GHz Band. One important aspect of the CBRS network is the limitation of interference, e.g., radio transmission, from multiple transmission sources, e.g., multiple CBSD devices located near each other or in close proximity to one another. The CBRS network includes Spectrum Access Systems that obtain information about registered or licensed commercial users in the 3.5 GHz band from FCC databases and information about federal incumbent users of the band from ESC (Environmental Sensing Capability) system and interact directly or indirectly with CBSDs operating in the band to ensure that Citizens Broadband Radio Service users operate in a manner consistent with their authorizations and promote efficient use of the spectrum resource. Among the Spectrum Access System functions as defined in the Amendment of the Commission's Rules with Regard to Commercial Operations in the 3550-3650 MHz Band released Apr. 21, 2015 are that: it determines the available frequencies at a given geographic location and assign them to CBSDs; it determines the maximum permissible transmission power level for CBSDs at a given location and communicates that information to the CBSDs; it registers and authenticates the identification information and location of CBSDs; it enforces exclusion and protection zones, including any future changes to such Zones, to ensure compatibility between Citizens Broadband Radio Service users and incumbent federal operations; it protects Priority Access Licensees (PAL) from impermissible interference from other Citizens Broadband Radio Service users; ensures secure and reliable transmission of information between the SAS, ESC, and CBSDs; and it facilitates coordination and information exchange between SASs. Through the management of the CBSDs power transmission levels in a geographical area the SAS manages the radio interference in the geographical area. When a CBSD device is activated or turned on so that it begins wireless transmissions the transmission power of nearby CBSD devices is turned down or decreased in order to decrease electromagnetic interference to the newly active CBSD. This reduction in the transmit power of the nearby CBSD device or devices creates service disruptions and service degradations in the CBRS network since previously covered user devices will out of coverage if the power of the a currently active CBSD device or devices is decreased. Various embodiments of the present invention minimize and/or eliminate the service distributions and/or service degradations caused when a CBSD device enters an active state or mode in which it begins transmitting to UE devices from an inactive state or mode in which it was not transmitting to UE devices and one or more pre-existing active CBSD devices receive a message to power down or reduce their power transmission level. The CBSD maximum transmission power is determined as an EIRP (Equivalent Isotropically Radiated Power) level.

One exemplary communications system used to implement an exemplary embodiment in accordance with the present invention is shown in FIG. 1.

FIG. 1 illustrates an exemplary communications system 100 having an architecture implemented in accordance with the present invention. The communications system 100 includes a CBRS network coupled to core network elements, e.g., Long Term Evolution (LTE) Evolved Packet Core Network elements. The exemplary communications system 100 includes a Citizens Broadcast Radio Service Device (CBSD) 1 102, a CBSD 2 104, a Spectrum Access System device 106, a plurality of user equipment (UE) devices UE 1 110, UE 2 112, UE 3 114, UE 4 116, UE 5 118, UE 6 120, UE 7 122, UE 8 124, and UE 9 126, LTE Evolved Packet Network 150, communications links 128, 132, 134, 138, 140, 160, 162, 164, 166, 168, 170, and 172. Circle 108 illustrates a first cell of the CBRS network which is serviced by the CBSD 1 102. The first cell 108 illustrates the wireless coverage range of CBSD 1 at a first time T1. The user equipment devices also sometimes referred to as user terminal devices UE 1 110, UE 2 112, UE 3 114, UE 4 116, and UE 5 118 are located in the first cell 108 are in active wireless communications with CBSD 1 102. Communications links 160, 162, 168, 164 and 166 illustrate wireless communications channels, e.g., radio channels, over which CBSD 1 102 and UE 1 110, UE 2 112, UE 3 114, UE 4 116, and UE 5 118 communicate respectively. The user equipment devices UE 6 120, UE 7 122, UE 8 124 and UE 9 126 are located outside of the first cell 108 and are not in communication with CBSD 1 102 as they are outside of the CBSD 1 coverage area.

The communications links 138 and 140 are typically wired communications links or fiber optic cables which couple the CBSD 1 102 to the SAS 1 106 and CBSD 2 104 to the SAS 1 106 respectively.

The core network 150 is illustrated as an exemplary LTE Evolved Packet Core Network 150 including a Mobility Management Entity (MME) 152, a Serving Gateway (S-GW) 154, a PDN Gateway (P-GW) 156, and an Operator's IP Services element, e.g., IMS and PSS. Other network elements such as a Policy Control and Charging Rules Function node and a Home Subscriber Server, may be, and in most embodiments are, also included in the core network 150. The elements also referred to as devices or nodes of the core network 150 are coupled together via communications links so that they can exchange information. Communications link 174 couples MME 152 to S-GW 154. Communications link 176 couples S-GW 154 to P-GW 156. Communications link 176 couples the P-GW 156 to the core network operator's Internet Protocol (IP) services 158. The MME 152 is a mobility management entity control node that processes the signaling received from the CBSD 1 102 and CBSD 2 104 devices and the core network. Various functions of the MME 152, P-GW 156 and S-GW 154 will now be discussed. In the exemplary embodiment the MME 158 includes a mapping of the Physical Cell Identity (PCI) and the Internet Protocol address of the CBSD device serving the corresponding cell in memory. The PDN Gateway 156 is responsible for IP address allocation for the UE as well as Quality of Service enforcement and flow based charging. The Serving Gateway 154 serves as the local mobility anchor and all user IP packets are transferred through the Serving Gateway.

The CBSD 1 102 is coupled to the core network 150 via communications links. For example, communications link 132 couples CBSD 1 102 to Serving Gateway 152 and communications link 134 couples CBSD 1 to Mobility Management Entity 152. Similarly, CBSD 2 104 is coupled to the core network 150 via communication links. For example, communications link 170 couples CBSD 2 104 to Mobility Management Entity 152 and communications link 172 couples CBSD 2 104 to Serving Gateway 152.

The communications link 128 couples CBSD 1 102 to CBSD 2 104.

The communications links 160, 162, 164, 166 and 168 are wireless or over the air communications links. The communications links 128, 132, 134, 138, 140, 170, 172, 174, 176 and 178 are typically wired or fiber optic communications links. It is to be understood that communication links shown in system 100 are only exemplary and other network configurations and communications links may be employed that couple together the devices, servers, nodes, entities and controllers of the system.

In FIG. 1, the system 100 is shown at time T1 when the CBSD 2 104 is not in an activated mode that is it is not transmitting to UE devices. UE devices UE 6 120, UE 7 122, UE 8 124, UE 9 126 are not in communications with CBSD 1 102 as these user equipment devices are not within the CBSD 1 coverage area and are not in communications with CBSD 2 104 as CBSD 2 104 is not in an activated mode of operation in which it communicates with UE devices. The CBSD 2 104 in FIG. 1 may be, and in some embodiments is, communicating with the SAS 1 106 in preparation for entering an active mode of operation. While for the sake of simplicity in explaining the invention system 100 only illustrates a single active CBSD and a few UE devices, it will be appreciated that system 100 typically does include a plurality of active CBSDs in the CBRS network supporting a plurality of UE devices.

Elements or steps with the same reference numbers used in different figures are the same or similar and those elements or steps will not be described in detail again.

Figure 2:
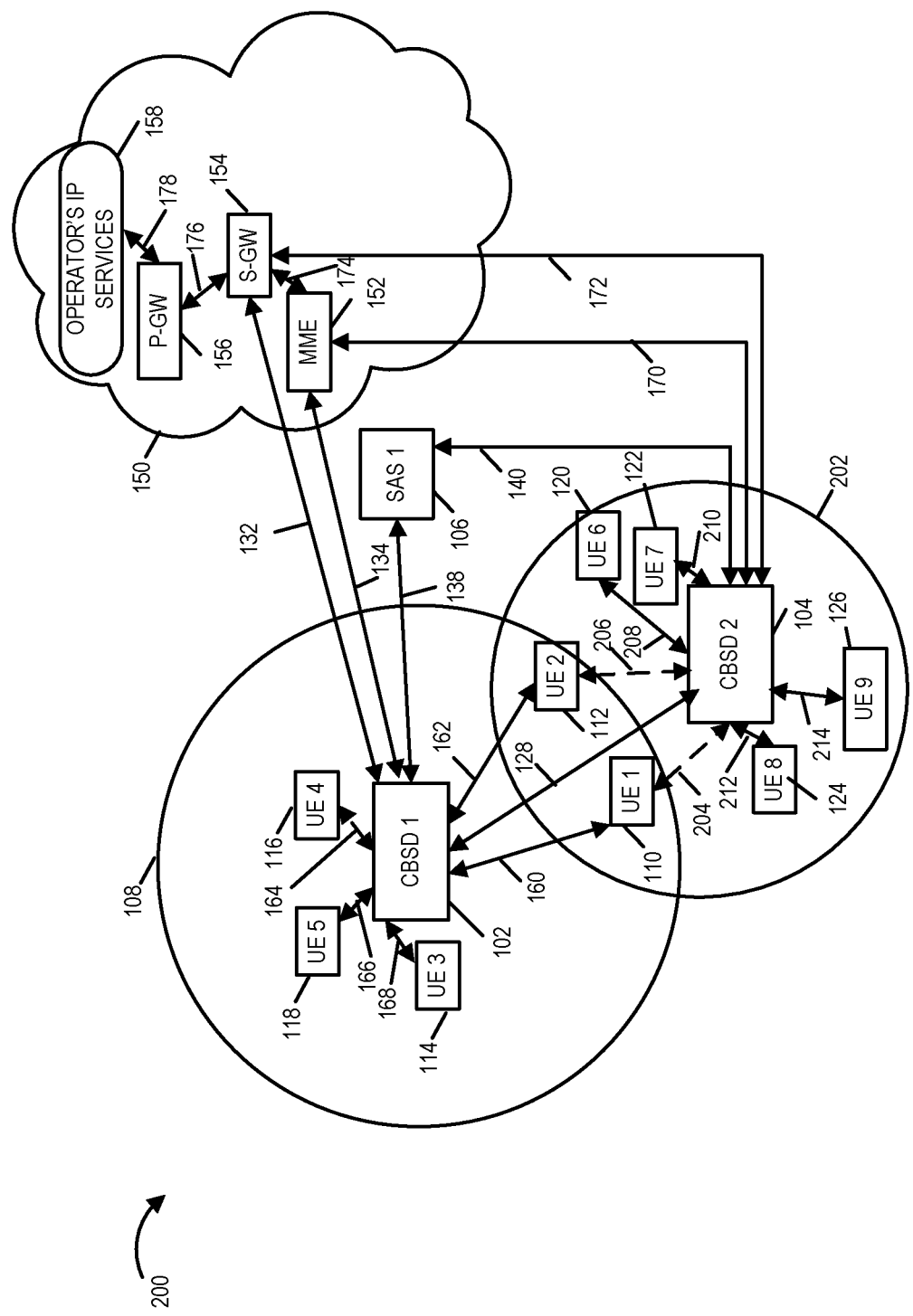
FIG. 2 illustrates the CBRS network system of FIG. 1 at a time T2 after the Citizens Broadband Radio Service Device 2 is activated.

FIG. 2 diagram 200 illustrates communications system 100 at a time T2 after T1 when CBSD 2 104 has entered an activated state or mode. In the activated state or mode, the CBSD 2 104 communicates with UE devices in its coverage area which attached to it. Circle 202 denotes a second cell 202 of the CBRS network in which the CBSD 2 104 is located and the coverage area supported by the CBSD 2 104. It should be noted that the coverage area of the first cell 108 and the second cell 202 at time T2 are overlapping with UE 1 110 and UE 2 112 being within the coverage area of CBSD 1 102 and CBSD 2 104. The CBSD 2 104 is illustrated as being in communication with UE 6 120, UE 7 122, UE 8 124 and UE 9 126 over wireless communications links 208, 210, 212 and 214 respectively. It should also be noted that at time T2 CBSD 2 104 is also in communication with UE 1 110 and UE 2 112 simultaneously with CBSD 1 102 over wireless communications links 204 and 206 respectively as is further described below. The dashed lines 204 and 206 indicate that CBSD 2 104 is communicating with UE 1 and UE 2 as part of CoMP session.

Figure 3:
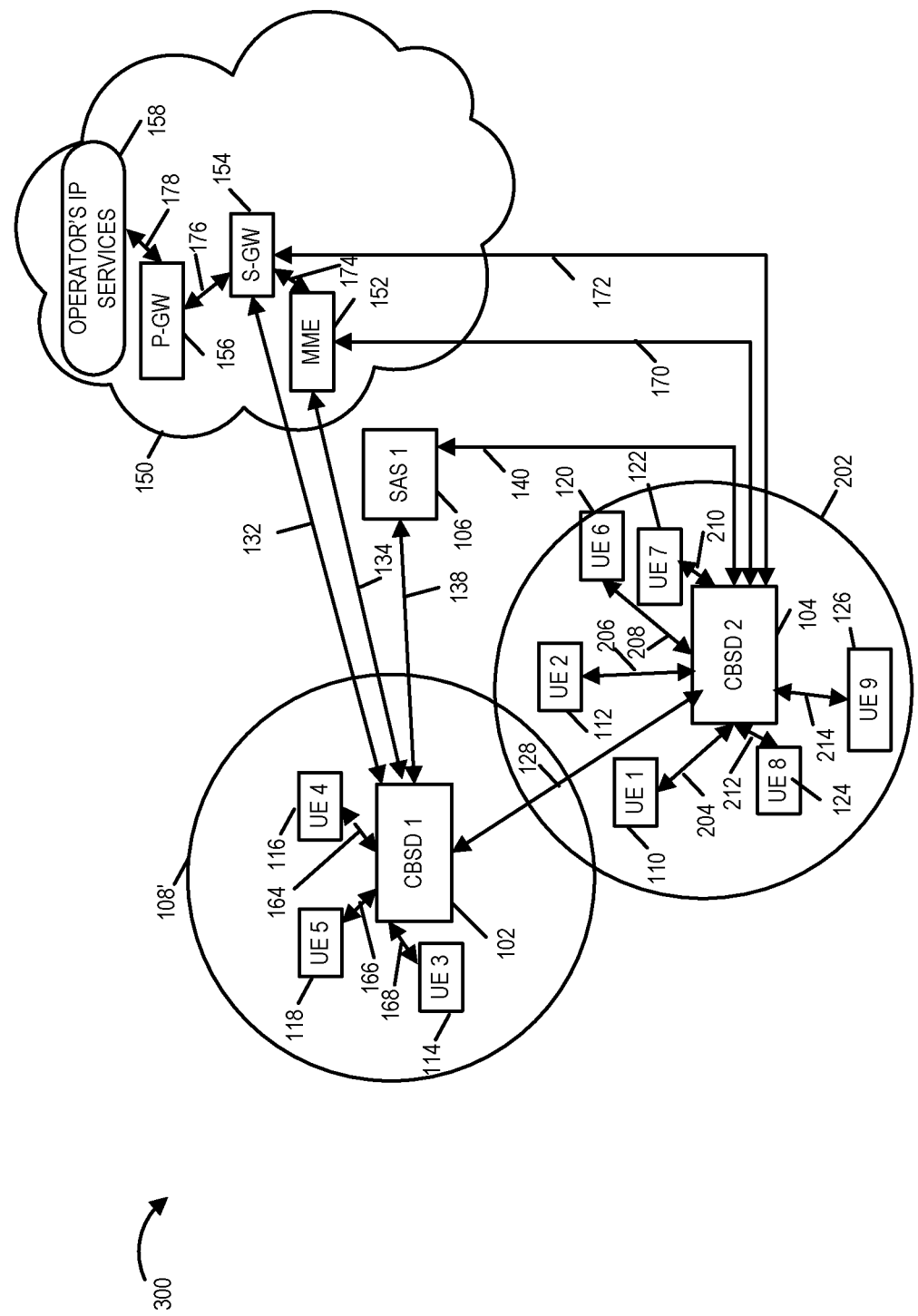
FIG. 3 illustrates the CBRS network system of FIG. 1 at a time T3.

FIG. 3 diagram 300 illustrates communications system 100 at a time T3 after T2 when CBSD 1 102 and CBSD2 104 are both in an active mode of operation and CBSD 1 102 has a reduced wireless coverage area 108'. That is the first cell's coverage area has been reduced to only include UE 3 114, UE 4 116, UE 5 118. The solid lines 204 and 206 indicate that CBSD 2 104 is communicating with UE 1 110 and UE 2 112 after a handoff from CBSD 1 to CBSD 2 or as a new connection to CBSD 2.

Figure 4:
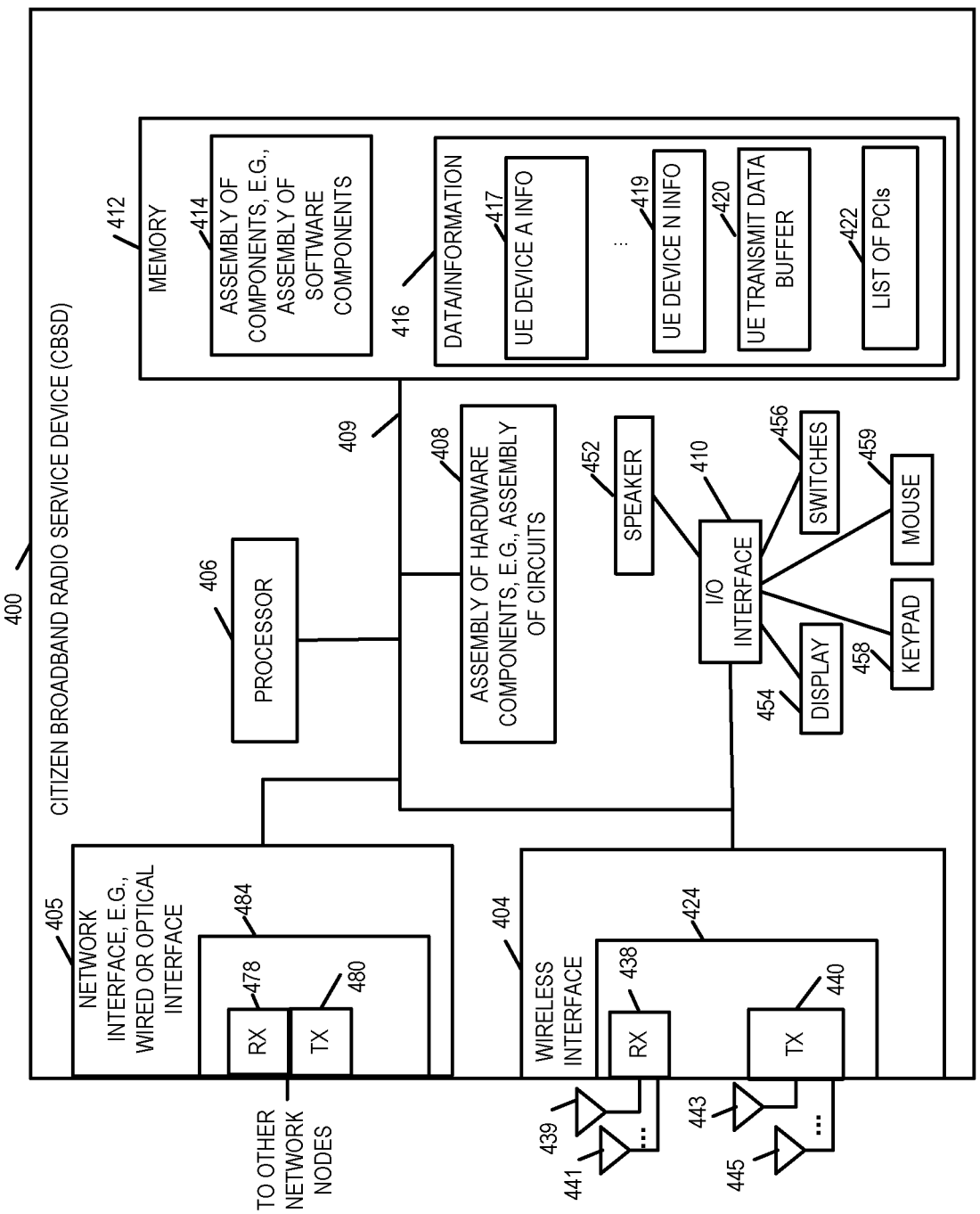
FIG. 4 illustrates details of an exemplary Citizens Broadband Radio Service Device (CBSD) in accordance with one embodiment of the present invention.

FIG. 4 is a drawing of an exemplary Citizens Broadband Radio Service Device (CBSD) 400 in accordance with an exemplary embodiment. The CBSD device 400, in some embodiments, incorporates Long Term Evolution (LTE), e.g., 4G LTE, eNodeB base station/access point capabilities. The CBSD device 400 also includes the capabilities of a CBSD as defined by the Federal Communications Commission's Rules with Regard to Commercial Operations in the 3550-3650 MHz Band. Exemplary CBSD device 400 includes a wireless interface 404, a network interface 405, e.g., a wired or optical interface, a processor 406, e.g., a CPU, an assembly of hardware components 408, e.g., an assembly of circuits, and I/O interface 410 and memory 412 coupled together via a bus 409 over which the various elements may interchange data and information. CBSD device 400 further includes a speaker 452, a display 453, switches 456, keypad 458 and mouse 459 coupled to I/O interface 410, via which the various I/O devices (452, 454, 456, 458, 459) may communicate with other elements (404, 406, 408, 412) of the CBSD device 400. Network interface 405 includes a receiver 478 and a transmitter 480. In some embodiments, receiver 478 and transmitter 480 are part of a transceiver 484. Wireless interface 404 includes a wireless receiver 438 and a wireless transmitter 440. In some embodiments, receiver 438 and transmitter 440 are part of a transceiver 442. In various embodiments, wireless interface 404 includes a plurality of wireless receivers and a plurality of wireless transmitters. Wireless receiver 438 is coupled to a plurality of receive antennas (receive antenna 1 439, . . . , receive antenna M 441), via which CBSD device 400 can receive wireless signal from other wireless communications devices including a second wireless communications device, e.g., a UE device. Wireless transmitter 440 is coupled to a plurality of wireless transmit antennas (transmit antenna 1 443, . . . , transmit antenna N 445) via which the CBSD 400 can transmit signals to other wireless communications devices including a second wireless communications device, e.g., a UE device. Memory 412 includes an assembly of component 414, e.g., an assembly of software components, and data/information 416. Data/information 416 includes UE device information corresponding to a plurality of user equipment devices (UE device A information 417, . . . , UE device N information 419 where A to N are the UE devices being serviced by the CBSD for example CBSD 1 102 services UE 1 . . . UE 5 as shown in FIG. 1, UE transmit data buffer 420, and Physical Cell Identifier List). In some embodiments, CBSD 1 102 and/or CBSD 2 104, are implemented in accordance with CBSD 400.

Figure 5:
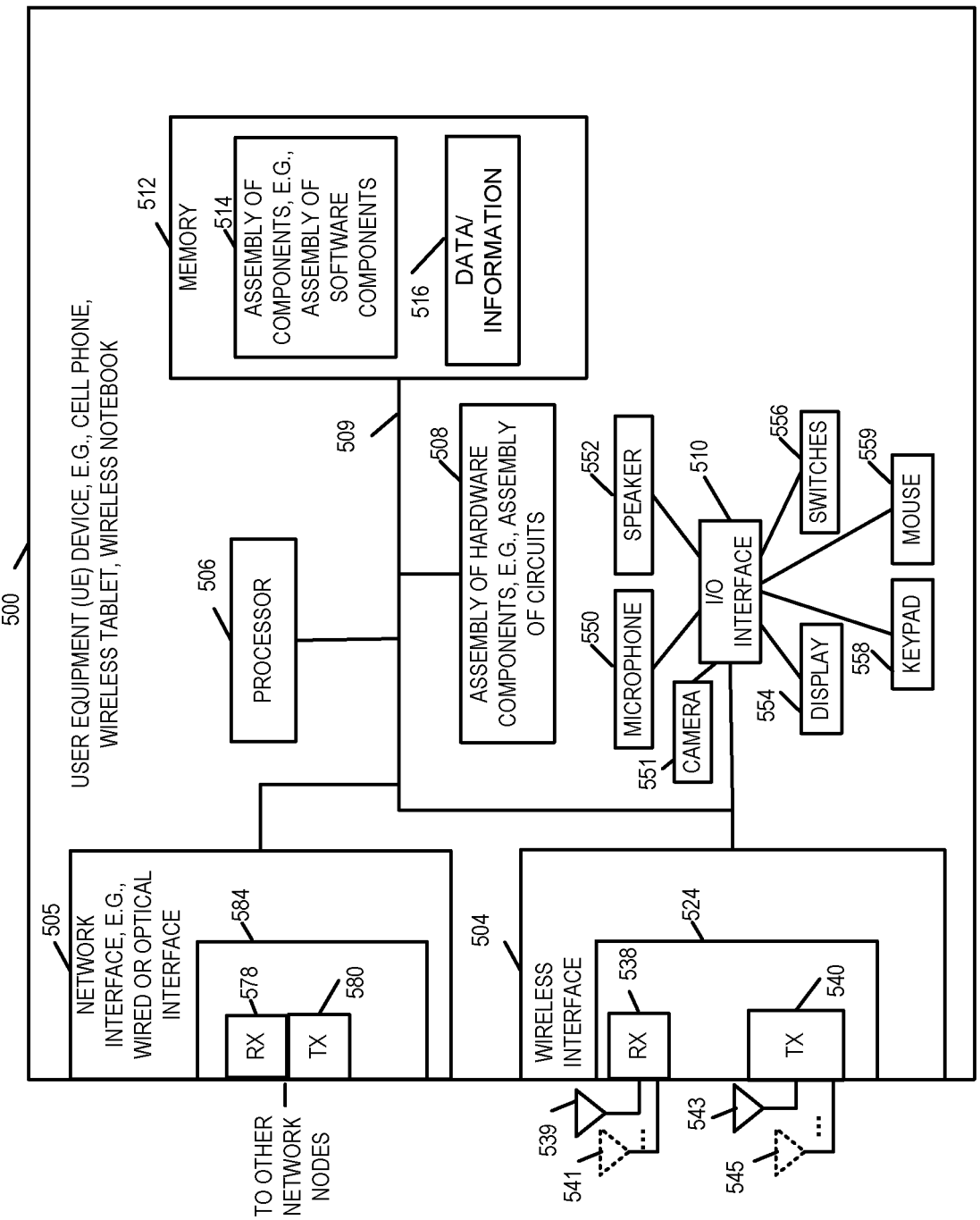
FIG. 5 illustrates details of an exemplary User Equipment (UE) device in accordance with one embodiment of the present invention.

FIG. 5 is a drawing of an exemplary user equipment (UE) device 500 in accordance with an exemplary embodiment. UE device 500 is, e.g., a mobile device such as a cell phone, a smart phone, wireless tablet or wireless notebook. UE device 500, in some embodiments, includes Long Term Evolution (LTE), e.g., 4G LTE, mobile device capabilities. Exemplary UE device 500 includes a wireless interface 504, a processor 506, e.g., a CPU, an assembly of hardware components 508, e.g., an assembly of circuits, and I/O interface 510 and memory 512 coupled together via a bus 509 over which the various elements may interchange data and information. UE device 500 further includes a microphone 550, camera 551, speaker 552, a display 553, e.g., a touch screen display, switches 556, keypad 558 and mouse 559 coupled to I/O interface 510, via which the various I/O devices (550, 551, 552, 554, 556, 558, 559) may communicate with other elements (504, 506, 508, 512) of the UE device. Network interface 505 includes a receiver 578 and a transmitter 580. In some embodiments, receiver 578 and transmitter 580 are part of a transceiver 584. Wireless interface 504 includes a wireless receiver 538 and a wireless transmitter 540. In some embodiments, receiver 538 and transmitter 540 are part of a transceiver 524. In various embodiments, wireless interface 504 includes a plurality of wireless receivers and a plurality of wireless transmitters. Wireless receiver 538 is coupled to one or more receive antennas (receive antenna 1 539, . . . , receive antenna M 541), via which UE device 500 can receive wireless signals from other wireless communications devices including, e.g., a CBSD device such as CBSD 400. Wireless transmitter 540 is coupled to one or more wireless transmit antennas (transmit antenna 1 543, . . . , transmit antenna N 545) via which the UE device 500 can transmit signals to other wireless communications device including a first wireless communications device, e.g., a CBSD 400. Memory 412 includes an assembly of components 414, e.g., an assembly of software components, and data/information 416.

Figure 6:
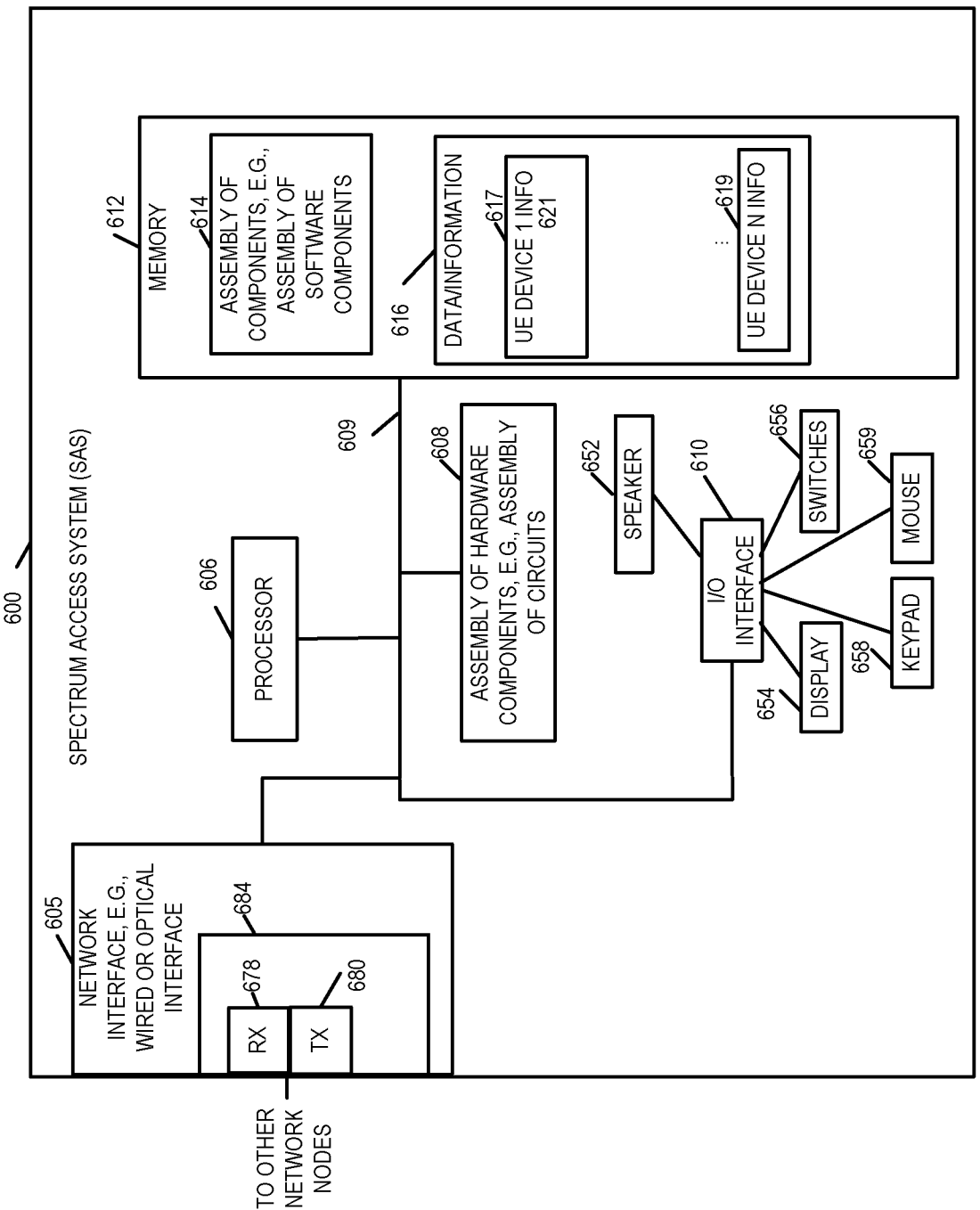
FIG. 6 illustrates details of an exemplary Spectrum Access System (SAS) in accordance with one embodiment of the present invention.

FIG. 6 is a drawing of an exemplary Spectrum Access System (SAS) device 600 in accordance with an exemplary embodiment. The SAS 600 includes the capabilities of a SAS as defined by the Federal Communications Commission's Rules with Regard to Commercial Operations in the 3550-3650 MHz Band. Exemplary SAS device 600 includes a network interface 605, e.g., a wired or optical interface, a processor 606, e.g., a CPU, an assembly of hardware components 608, e.g., an assembly of circuits, and I/O interface 610 and memory 612 coupled together via a bus 609 over which the various elements may interchange data and information. SAS 600 further includes a speaker 652, a display 653, switches 656, keypad 658 and mouse 659 coupled to I/O interface 610, via which the various I/O devices (652, 654, 656, 658, 659) may communicate with other elements (606, 608, 612) of the SAS 600. Network interface 605 includes a receiver 678 and a transmitter 680. The network interface 605 is typically used to communicate with other SAS devices and CBSD devices. In some embodiments, receiver 678 and transmitter 680 are part of a transceiver 684. Memory 612 includes an assembly of component 614, e.g., an assembly of software components, and data/information 616. Data/information 616 includes CBSD device information corresponding to a plurality of CBSD devices (CBSD device 1 information 102, . . . , CBSD device 2 information 104). In some embodiments, SAS 1 106 is implemented in accordance with CBSD 400.

Figure 7:
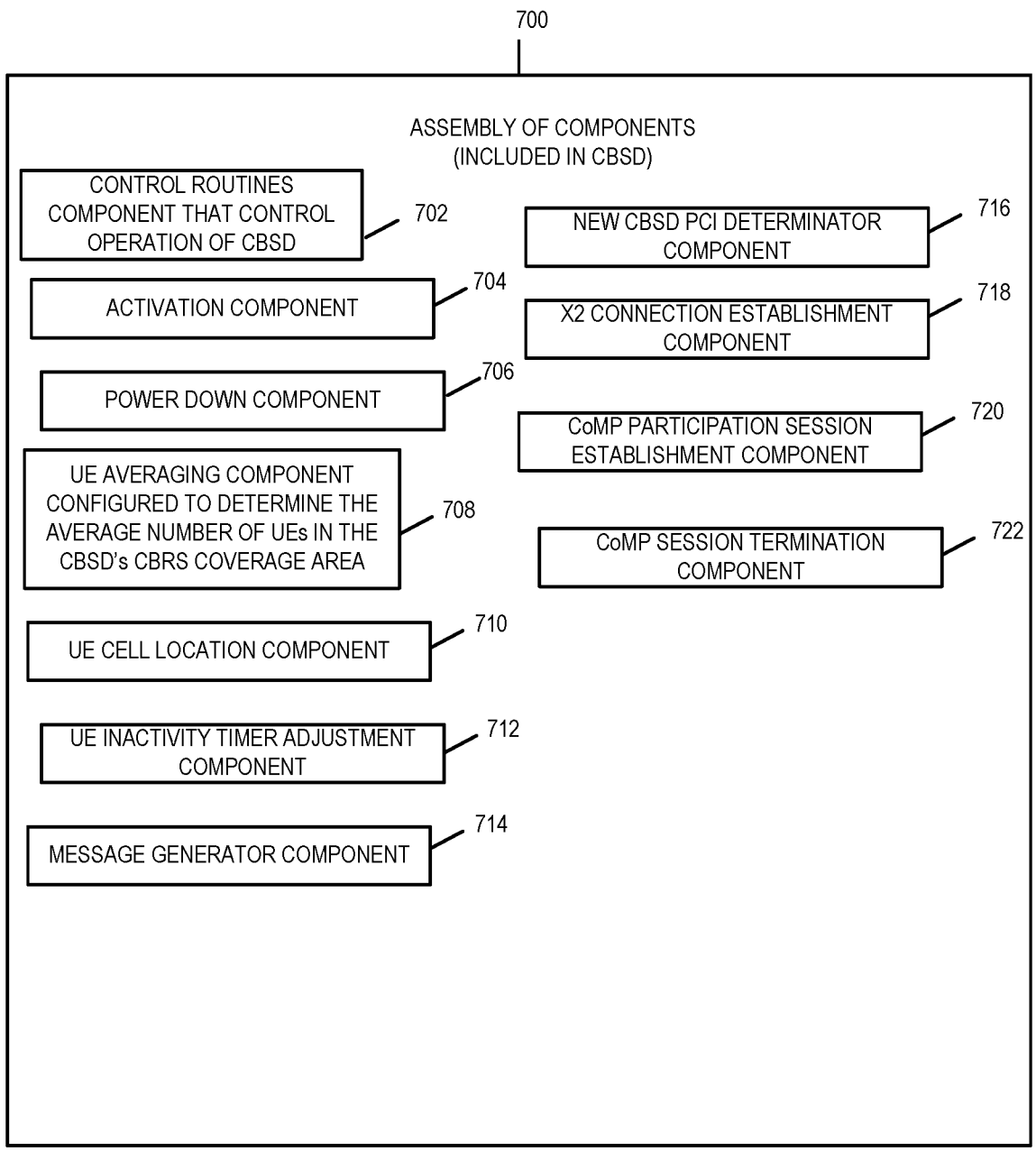
FIG. 7 illustrates an exemplary assembly of components for a CBSD in accordance with an embodiment of the present invention.

FIG. 7 is a drawing of an exemplary assembly of components 700 which may be included in an exemplary CBSD device, e.g., exemplary CBSD 400 of FIG. 4, in accordance with an exemplary embodiment. The components in the assembly of components 700 can, and in some embodiments are, implemented fully in hardware within a processor, e.g., processor 406, e.g., as individual circuits. The components in the assembly of components 700 can, and in some embodiments are, implemented fully in hardware within the assembly of hardware components 408, e.g., as individual circuits corresponding to the different components. In other embodiments some of the components are implemented, e.g., as circuits, within processor 406 with other components being implemented, e.g., as circuits within assembly of components 408, external to and coupled to the processor 406. As should be appreciated the level of integration of components on the processor and/or with some components being external to the processor may be one of design choice. Alternatively, rather than being implemented as circuits, all or some of the components may be implemented in software and stored in the memory 412 of the CBSD device 400, with the components controlling operation of CBSD device 400 to implement the functions corresponding to the components when the components are executed by a processor e.g., processor 406. In some such embodiments, the assembly of components 700 is included in the memory 412 as assembly of software components 414. In still other embodiments, various components in assembly of components 700 are implemented as a combination of hardware and software, e.g., with another circuit external to the processor providing input to the processor which then under software control operates to perform a portion of a component's function.

When implemented in software the components include code, which when executed by a processor, e.g., processor 406, configure the processor to implement the function corresponding to the component. In embodiments where the assembly of components 700 is stored in the memory 412, the memory 412 is a computer program product comprising a computer readable medium comprising code, e.g., individual code for each component, for causing at least one computer, e.g., processor 406, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 7 control and/or configure the CBSD device 400 or elements therein such as the processor 406, to perform the functions of corresponding steps illustrated and/or described in the method of one or more of the flowcharts, signaling diagrams and/or described with respect to any of the Figures. Thus the assembly of components 700 includes various components that perform functions of corresponding one or more described and/or illustrated steps of an exemplary method.

Assembly of components 700 includes a control routines component 702, an activation component 704, a power down component 706, an UE averaging component 708, an UE cell location component 710, an UE Inactivity Timer Adjustment Component 712, a message generator component 714, a new CBSD PCI determinator component 716, a X2 connection establishment component 718, a CoMP participation session establishment component 720 and a CoMP session termination component 722. The control routines component 702 is configured to control operation of the CBSD. The activation component 704 is configured to notify the SAS in the system prior to activation and then to activate by begin to communication with user equipment devices via wireless radio transmissions. The power down component 706 is configured to control the operation of the CBSD to reduce the transmitted power level of transmissions from the CBSD to UE devices in accordance with instructions from a power management Spectrum Access System device managing spectrum allocation and electromagnetic interference in the CBSD's CBRS coverage area. UE average component 708 is configured to determine the average number of UEs in the CBSD's CBRS coverage area over a predetermined period of time. The UE cell location component 710 is configured to determine the location of UE devices being serviced by the CBSD in the CBSD's coverage area/cell. The UE cell location component 710 is also configured to group the UEs being serviced by the CBSD into a group of edge UEs or a group of cell center UEs based on an indicator of the UE's distance from the center of the cell, the indicator of UE distance from the center of the cell being one of Reference Signal Received power information or UE timing advance information. UE inactivity timer adjustment component 712 is configured to increase or decrease the inactivity timer for UEs being serviced by the CBSD. The message generator component is configured to generate messages for transmission to other devices including X2 setup, connection and teardown message, Coordinated Multi-point Participation (CoMP) request, acceptance, teardown and termination messages, request for IP address messages, acknowledgement messages, data transmission messages. The new CBSD PCI determinator component is configured to determine the physical cell identifier (PCI) of a new CBSD that has been activated based on comparing PCI identifiers reported by UEs being serviced by the CBSD after activation of the new CBSD to a list of PCI identifiers stored in memory before the activation of the new CBSD and determining that the PCI which is not on the list of previously reported PCI identifiers corresponds to the new CBSD's PCI. The X2 connection establishment component 718 is configured to establish an X2 connection with another CBSD. The CoMP Participation session establishment 720 is configured to establish a CoMP participation session with another CBSD. The CoMP session termination component 722 is configured to terminate or teardown a CoMP session.

Figure 8:
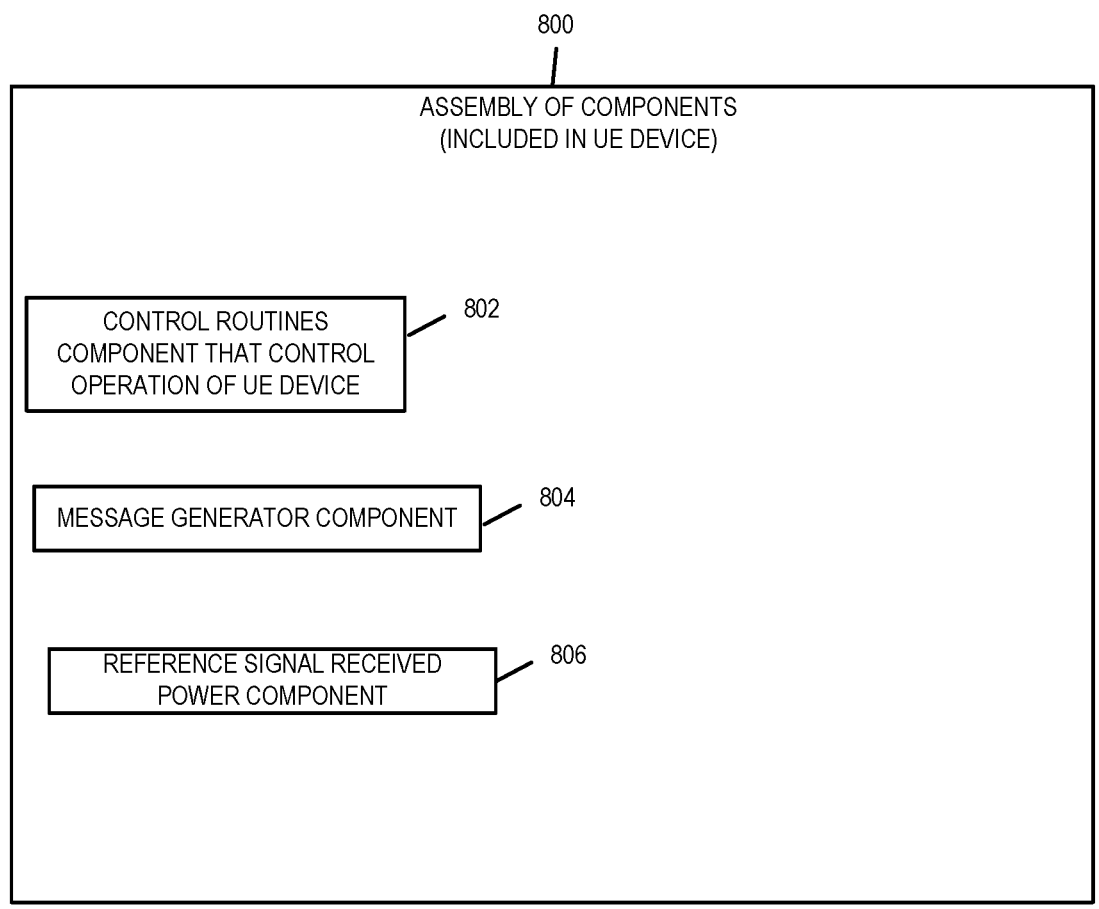
FIG. 8 illustrates an exemplary assembly of components for a user equipment device in accordance with an embodiment of the present invention.

FIG. 8 is a drawing of an exemplary assembly of components 800 which may be included in an exemplary user equipment (UE) device, e.g., UE device 500 of FIG. 5, in accordance with an exemplary embodiment. The components in the assembly of components 800 can, and in some embodiments are, implemented fully in hardware within a processor, e.g., processor 506, e.g., as individual circuits. The components in the assembly of components 800 can, and in some embodiments are, implemented fully in hardware within the assembly of hardware components 508, e.g., as individual circuits corresponding to the different components. In other embodiments some of the components are implemented, e.g., as circuits, within processor 506 with other components being implemented, e.g., as circuits within assembly of components 508, external to and coupled to the processor 506. As should be appreciated the level of integration of components on the processor and/or with some components being external to the processor may be one of design choice. Alternatively, rather than being implemented as circuits, all or some of the components may be implemented in software and stored in the memory 512 of the UE device 500, with the components controlling operation of UE device 500 to implement the functions corresponding to the components when the components are executed by a processor e.g., processor 506. In some such embodiments, the assembly of components 800 is included in the memory 512 as assembly of software components 514. In still other embodiments, various components in assembly of components 800 are implemented as a combination of hardware and software, e.g., with another circuit external to the processor providing input to the processor which then under software control operates to perform a portion of a component's function. When implemented in software the components include code, which when executed by a processor, e.g., processor 506, configure the processor to implement the function corresponding to the component. In embodiments where the assembly of components 800 is stored in the memory 512, the memory 512 is a computer program product comprising a computer readable medium comprising code, e.g., individual code for each component, for causing at least one computer, e.g., processor 506, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 8 control and/or configure the UE device 500 or elements therein such as the processor 506, to perform the functions of corresponding steps illustrated and/or described in the method of one or more of the flowcharts, signaling diagrams and/or described with respect to any of the Figures. Thus the assembly of components 800 includes various components that perform functions of corresponding one or more described and/or illustrated steps of an exemplary method.

Assembly of components 800 includes a control routines component 802, a message generator component 804, a UE inactivity timer component 806, and a reference signal received power component. The control routines component 802 is configured to control operation of the UE. The message generator component 804 is configured to generate messages for transmission to CBSD devices. The reference signal received power component 808 is configured to measure the average power received from a single cell specific Reference Signal Resource Element (e.g., each CBSD from which a signal is received by the UE) and to determine the corresponding physical cell identifier corresponding to the Reference Signal Resource Element from which the signal was received for reporting to the CBSD device servicing the UE.

Figure 9:
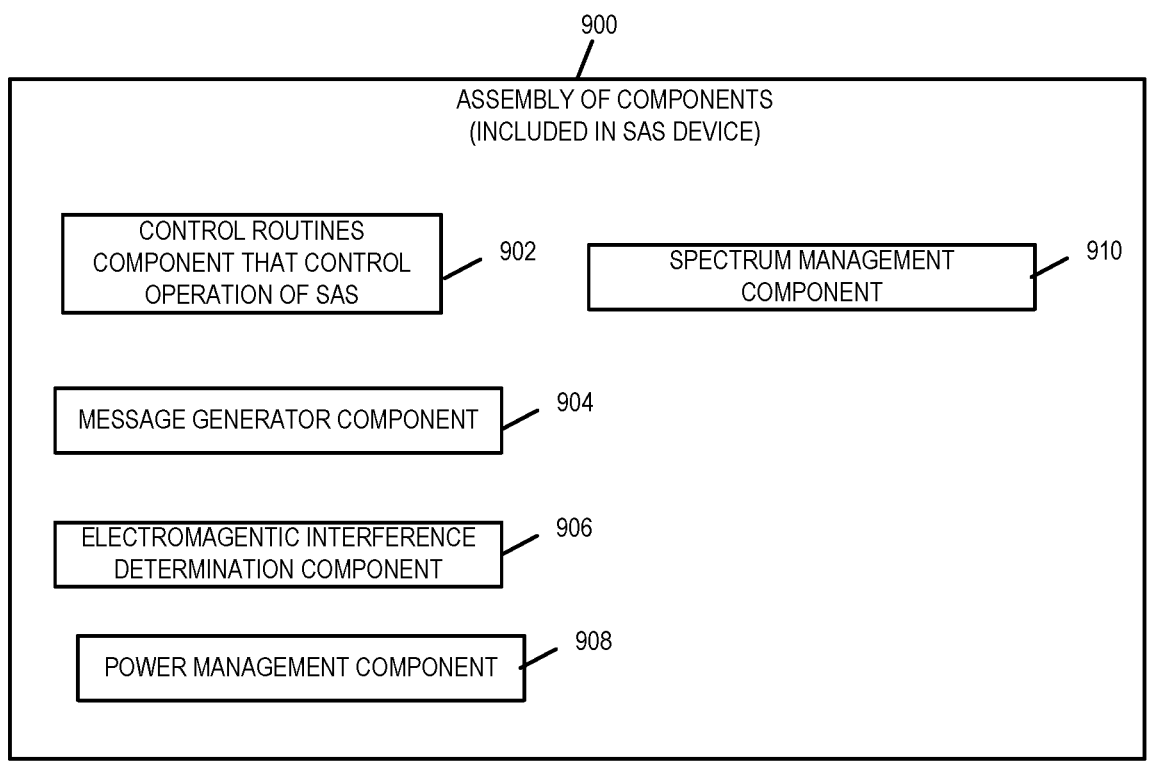
FIG. 9 illustrates an exemplary assembly of components for a SAS device in accordance with an embodiment of the present invention.

FIG. 9 is a drawing of an exemplary assembly of components 900 which may be included in an exemplary SAS device, e.g., exemplary SAS 600 of FIG. 6, in accordance with an exemplary embodiment. The components in the assembly of components 900 can, and in some embodiments are, implemented fully in hardware within a processor, e.g., processor 606, e.g., as individual circuits. The components in the assembly of components 900 can, and in some embodiments are, implemented fully in hardware within the assembly of hardware components 608, e.g., as individual circuits corresponding to the different components. In other embodiments some of the components are implemented, e.g., as circuits, within processor 606 with other components being implemented, e.g., as circuits within assembly of components 608, external to and coupled to the processor 606. As should be appreciated the level of integration of components on the processor and/or with some components being external to the processor may be one of design choice. Alternatively, rather than being implemented as circuits, all or some of the components may be implemented in software and stored in the memory 612 of the SAS 600, with the components controlling operation of SAS 600 to implement the functions corresponding to the components when the components are executed by a processor e.g., processor 606. In some such embodiments, the assembly of components 900 is included in the memory 612 as assembly of software components 614. In still other embodiments, various components in assembly of components 900 are implemented as a combination of hardware and software, e.g., with another circuit external to the processor providing input to the processor which then under software control operates to perform a portion of a component's function.

When implemented in software the components include code, which when executed by a processor, e.g., processor 606, configure the processor to implement the function corresponding to the component. In embodiments where the assembly of components 900 is stored in the memory 612, the memory 612 is a computer program product comprising a computer readable medium comprising code, e.g., individual code for each component, for causing at least one computer, e.g., processor 606, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 9 control and/or configure the SAS 600 or elements therein such as the processor 606, to perform the functions of corresponding steps illustrated and/or described in the method of one or more of the flowcharts, signaling diagrams and/or described with respect to any of the Figures. Thus the assembly of components 900 includes various components that perform functions of corresponding one or more described and/or illustrated steps of an exemplary method.

Assembly of components 900 includes a control routines component 902, a message generator component 904, an electromagnetic interference determination component 906, and a power determination for active CBSD component. The control routines component 902 is configured to control operation of the SAS. The message generator component 904 is configured to generate messages for transmission to CBSD devices, e.g., power down instruction messages. The electromagnetic interference determination component is configured to determine actual or potential electromagnetic interference to be caused by wireless, e.g., radio transmission from active CBSD devices or CBSDs devices which are to become active. The power management component 908 is configured to manage power transmission levels to maximize usage of spectrum while minimizing interference. The power management component 908 determines the power transmission level reductions for CBSDs when a new CBSD is activated and added to the CBRS network. The spectrum management component 910 is configured to manage the allocation of frequency spectrum in the CBRS network.

Figure 10B:
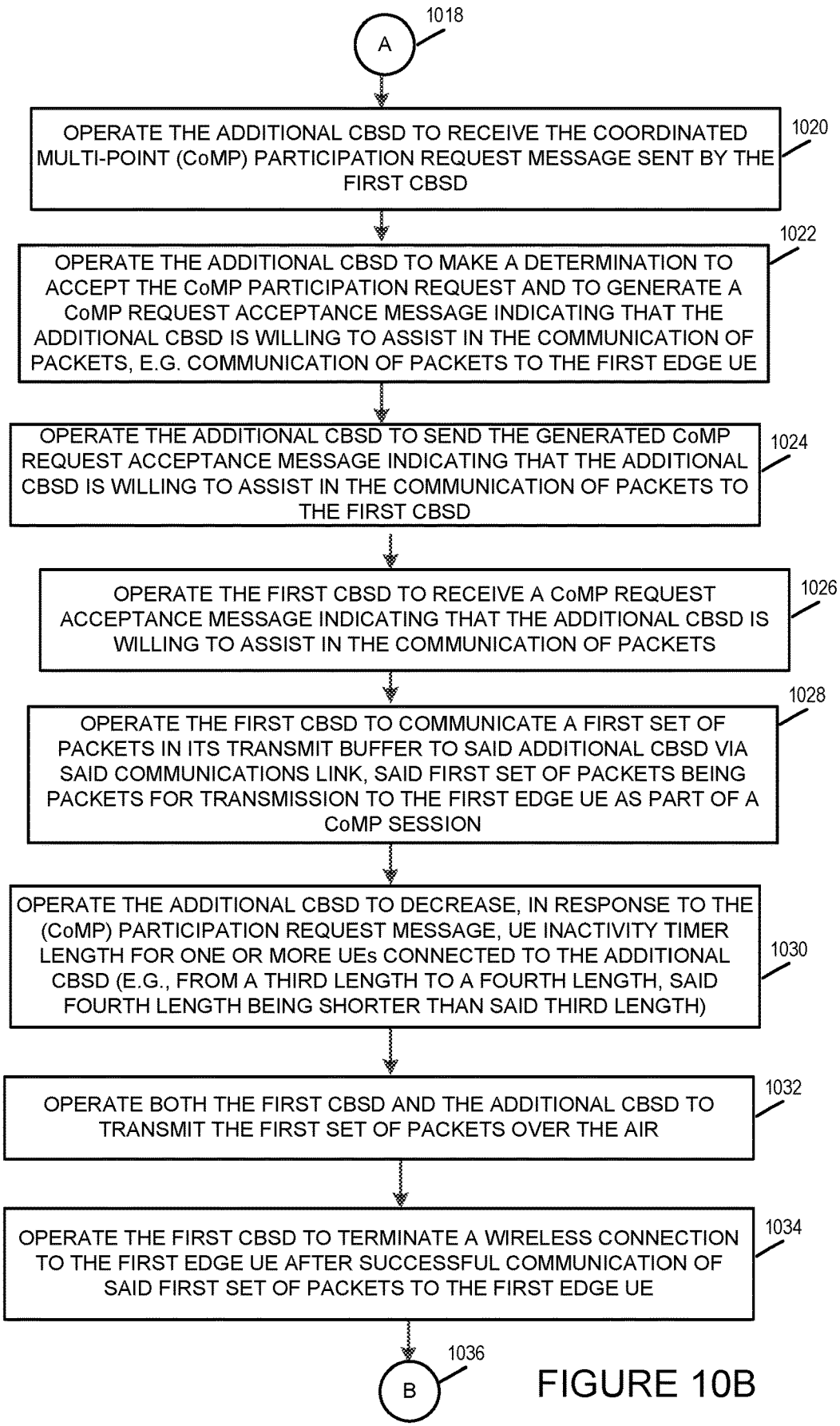
FIG. 10B illustrates the steps of the second part of an exemplary communications method in accordance with one embodiment of the present invention.
Figure 10C:
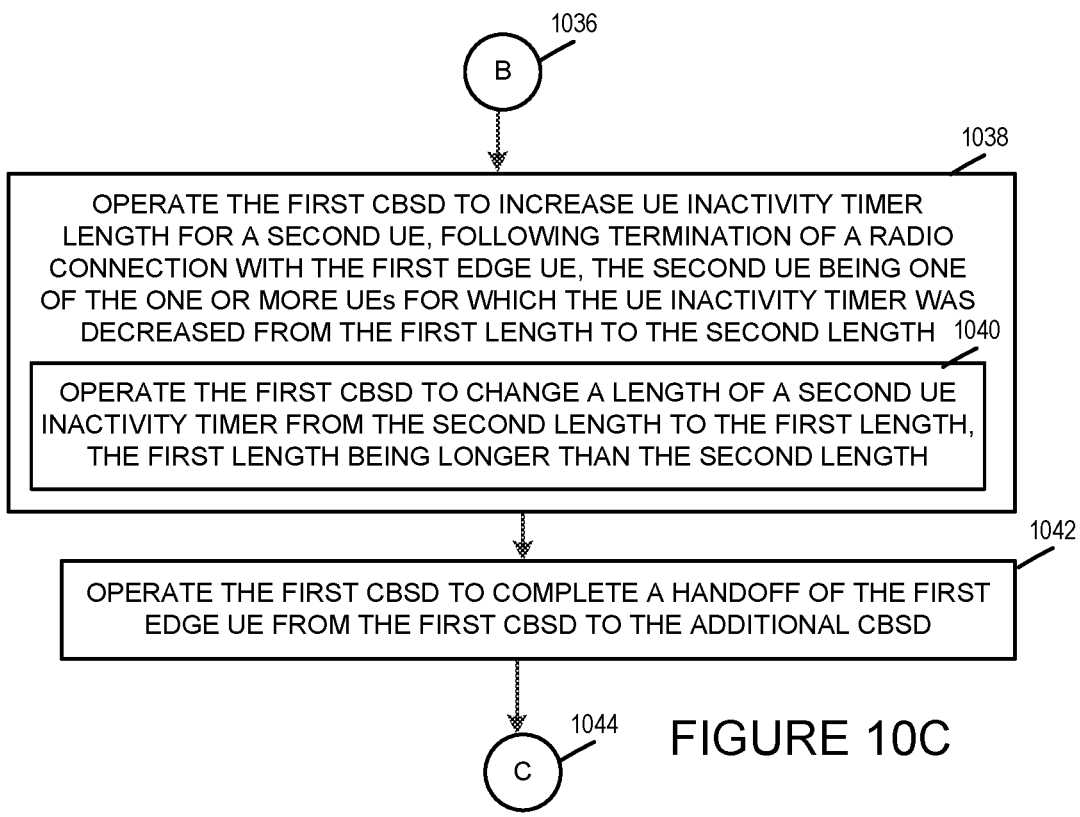
FIG. 10C illustrates the steps of the third part of an exemplary communications method in accordance with one embodiment of the present invention.

FIG. 10, which comprises the combination of FIGS. 10A, 10B, and 10C illustrates an exemplary communications method 1000 including steps of a method operating a first CBSD in a first cell and steps of operating another CBSD in another cell. FIG. 10A illustrates the steps of the first part of an exemplary method 1000 in accordance with one embodiment of the present invention. FIG. 10B illustrates the steps of the second part of an exemplary method 1000 in accordance with one embodiment of the present invention. FIG. 10C illustrates the steps of the third part of an exemplary method 1000 in accordance with one embodiment of the present invention.

For explanatory purposes the exemplary method 1000 will be explained in connection with the exemplary communications system 100 illustrated in FIG. 1 although it should be understand that the method may be implemented using other systems and other system configurations then those illustrated in FIG. 1.

The method 1000 shown in FIG. 10 will now be discussed in detail. The method starts in start step 1002 shown on FIG. 10A with the devices in system 100 being initialized and becoming operational. CBSD 2 104 while operational is not in an active mode or state, i.e., CBSD 2 104 is not communicating with any UE devices but may be, and in some embodiments is in communication with the SAS 106. Over the air communications links or channels are established between UE 1 110, UE 2 112, UE 3 114, UE 4 116, and UE 5 118 over which packets of data are transmitted from the CBSD 1 102 to the UE devices in the cell 108.

Operation proceeds from start step 1002 to step 1004.

In step 1004, the first CBSD, e.g., CBSD 1 102, is operated to receive a power down message from a Spectrum Access Server, e.g., SAS 106. The power down message is a message instructing the first CBSD to reduce the power level of its over the air radio transmission communications signals to the UE devices it is communicating with in the first cell (108). An SAS device will transmit such a power down message to the first CBSD when another CBSD, e.g., CBSD 2 104, becomes active or enters an active mode or state where it begins transmitting to UE devices in its coverage area. The SAS device transmits the power down command to prevent interference of the radio transmissions of the first CBSD and the additional CBSD which has entered an active mode or state of operation, i.e., the additional CBSD begins transmitting messages to UE devices. The CBSD receives typically receives the power down message from the SAS by the receiver 478 of the network interface 405. Operation proceeds from step 1004 to step 1006.

In step 1006, the first CBSD is operated to receive at the first CBSD Reference Signal Received Power (RSRP) information and corresponding Physical Cell Identifier (PCI) information from at least a first edge UE device, e.g., UE 1 110. The Reference Signal Received Power information provides information on at least one additional CBSD, e.g., CBSD 2 104, which can communicate with the first edge UE, e.g., UE 1 110. Operation proceeds from step 1006 to step 1008.

In step 1008, the first CBSD is operated to group UE devices being served by the first CBSD into a group of edge UE devices and a group of cell center UE devices. The groupings being based on an indicator of UE distance from the center of the cell. The indicator of UE distance from the center of the cell being one of reference signal received power information or UE timing advance information. In the example of system 100 shown in FIG. 1, the CBSD 1 102 of cell 108 is in over the air wireless communications with UE 1 110, UE 2 112, UE 3 114, UE 4 116, and UE 5 118. The CBSD 1 groups the UE 1 110 and UE 2 112 into a group of edge of cell UEs and the UEs UE 3 114, UE 4 116, and UE 5 118 into a group of cell center UEs based on the reference signal received power information received from the UEs or UE timing advance information. Operation proceeds from step 1008 to step 1010.

In step 1010, the first CBSD is operated in response to the power down message to decrease the UE inactivity timer length for one or more UEs from a first length to a second length. The second length is shorter than the first length. In the exemplary embodiment, one or more UEs in the group of the cell center UEs (UE 3 114, UE 4 116 and UE 5 118) are sent a message to decrease their UE inactivity timer. In some embodiments in addition to the first CBSD being operated to decrease the UE inactivity timer length for one or more UEs, the first CBSD is operated to send a message to one or more UEs in the cell to increase their inactivity timer length. For example, in some embodiments, the first CBSD is operated to send a message to one or more UEs in the group of cell edge UEs (UE 1 110 and UE 2 112) to increase their UE inactivity timer length from a fifth length to a sixth length wherein the sixth length is longer than the fifth length. Operation proceeds from step 1010 to step 1012.

In step 1012, the first CBSD is operated to transmit packets to UEs at an edge of the first cell, e.g., UE 1 110 and UE 2 112 which are on the edge of cell 108. Operation proceeds from step 1012 to step 1014.

In step 1014, the first CBSD (e.g., CBSD 1 102) is operated to establish a connection (e.g., X2 connection) with the another CBSD (e.g., CBSD 2 104). In some embodiments, this step includes the first CBSD requesting the address of the additional CBSD (e.g., CBSD 2 104) from a Mobility Management Entity device (e.g., MME 150 of FIG. 1) using the Physical Cell Identifier (PCI) information received from the at least a first cell edge UE (e.g., UE 1 102) in step 1006. Operation proceeds from step 1014 to step 1016.

In step 1016, the first CBSD (e.g., CBSD 1 102) is operated to send a Coordinated Multi-Point (CoMP) Participation request message to the additional CBSD (CBSD 2 104). Operation proceeds from step 1016 via connection node A 1018 to step 1020 shown on FIG. 10B.

In step 1020, the additional CBSD is operated to receive the Coordinated Multi-point (CoMP) Participation request message sent by the first CBSD. Operation proceeds from step 1020 to step 1022.

In step 1022, the additional CBSD is operated to make a determination to accept the CoMP participation request and to generate a CoMP request acceptance message indicating that the additional CBSD is willing to assist in the communication of packets. In this example, the packets are to be sent to the UE 1 102. Operation proceeds from step 1022 to step 1024.

In step 1024, the additional CBSD is operated to send the generated CoMP request acceptance message to the first CBSD. Operation proceeds from step 1024 to step 1026.

In step 1026, the first CBSD is operated to receive the CoMP request acceptance message indicating that the additional CBSD is willing to assist in the communication of packets. Operation proceeds from step 1026 to step 1028.

In step 1028, the first CBSD is operated to communicate a first set of packets in the first CBSD transmit buffer to the another CBSD via the established connection, e.g., an established communications link, with the additional CBSD. The first set of packets being packets for transmission, (e.g., to be transmitted) to the first edge UE, e.g., UE 1 102) as part of a CoMP session. Operation proceeds from step 1028 to step 1030.

In step 1030, the additional CBSD (e.g., CBSD 2 104) is operated to decrease, in response to the (CoMP) participation request message, the UE inactivity timer length for one or more UEs connected to the additional CBSD (e.g., from a third length to a fourth length, the fourth length being shorter than said third length). In some embodiments, the UE inactivity timer length is decreased for all UEs connected to the additional CBSD without regard to whether they are edge of cell UEs or center cell UEs. Operation proceeds from step 1030 to step 1032.

In step 1032, the first CBSD and the additional CBSD are both operated to transmit the first set of packets over the air to the first edge UE device (e.g., UE 1 102). In the exemplary embodiment both the first CBSD and the additional CBSD simultaneously or in parallel transmit the first set of packets over the air to first edge UE device. Operation proceeds from step 1032 to step 1034.

In step 1034, the first CBSD is operated to terminate a wireless connection to the first edge UE after successful communication of the first set of packets to the first edge UE. In the exemplary embodiment, after the packets in the first CBSD's transmit buffer to be transmitted to the first edge UE (e.g., UE 1 110) at the time the power down message was received are successfully transmitted to the first edge UE, the first CBSD terminates the radio connection between the first CBSD and the first edge UE thereby freeing up resources that were being used to communicate with the first edge UE. Operation proceeds from step 1034 via connection node B 1036 to step 1038 shown on FIG. 10C.

In step 1038, the first CBSD is operated to increase UE inactivity timer length for a second UE (e.g., UE 3 106), following termination of a wireless connection, e.g., a radio connection, with the first edge UE (UE 102). The second UE being one of the one or more UEs for which the UE Inactivity timer was decreased from the first length to the second length. In some embodiments, step 1038 includes sub-step 1040. In sub-step 1040, the first CBSD is operated to change a length of a second UE inactivity timer from the second length to the first length, the first length being longer than the second length. Operation proceeds from step 1038 to step 1042.

In step 1042, the first CBSD completes a handoff of the first edge UE (e.g., UE 1 102) from the first CBSD (CBSD 1 102) to the additional CBSD (CBSD 2 104). Operation proceeds from step 1042 via connection C 1044 to step 1004 shown on FIG. 10A wherein the steps of the method are repeated upon the receipt of another power down message from the SAS.

Figure 11A:
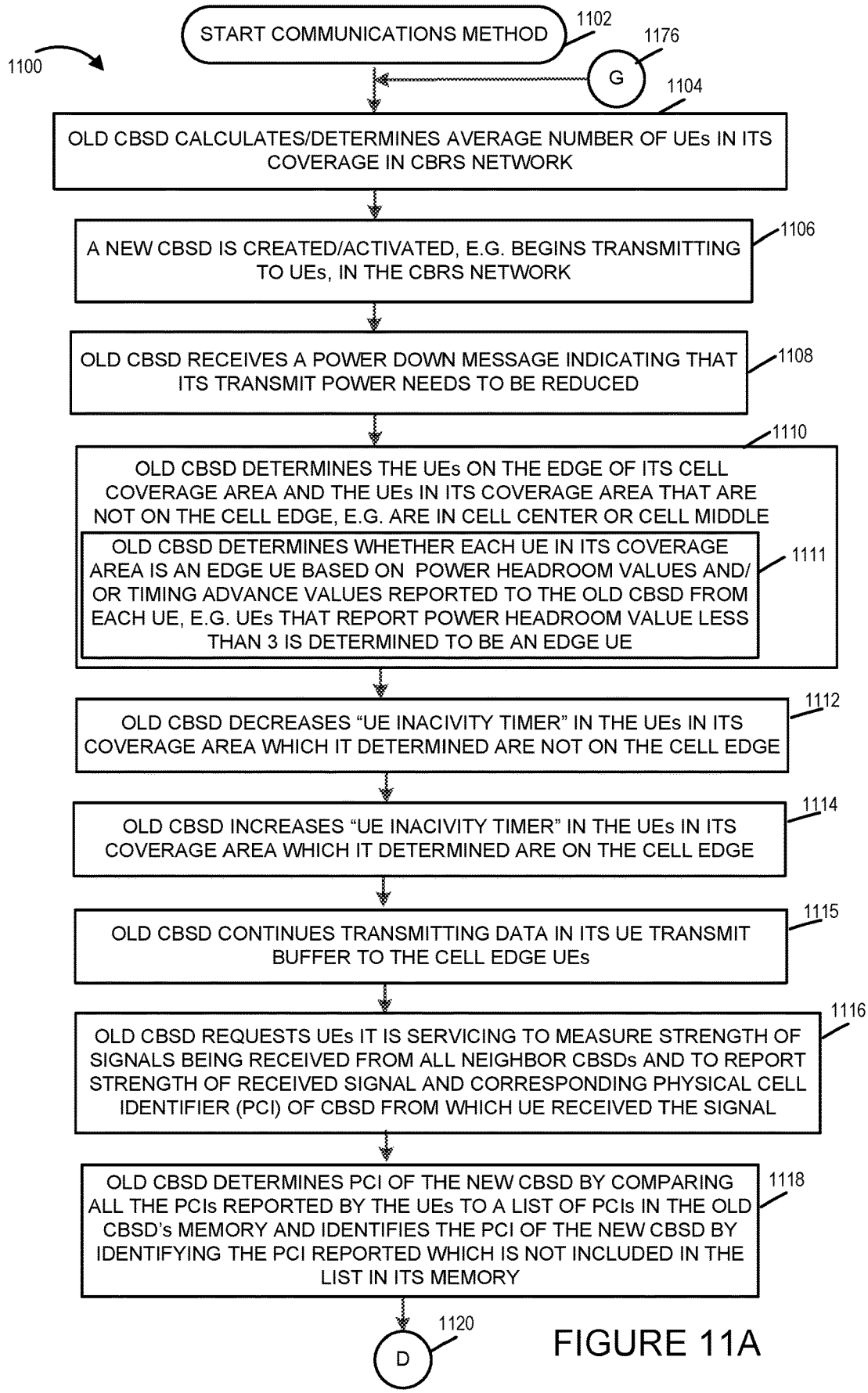
FIG. 11A illustrates the steps of the first part of an exemplary communications method in accordance with one embodiment of the present invention.
Figure 11B:
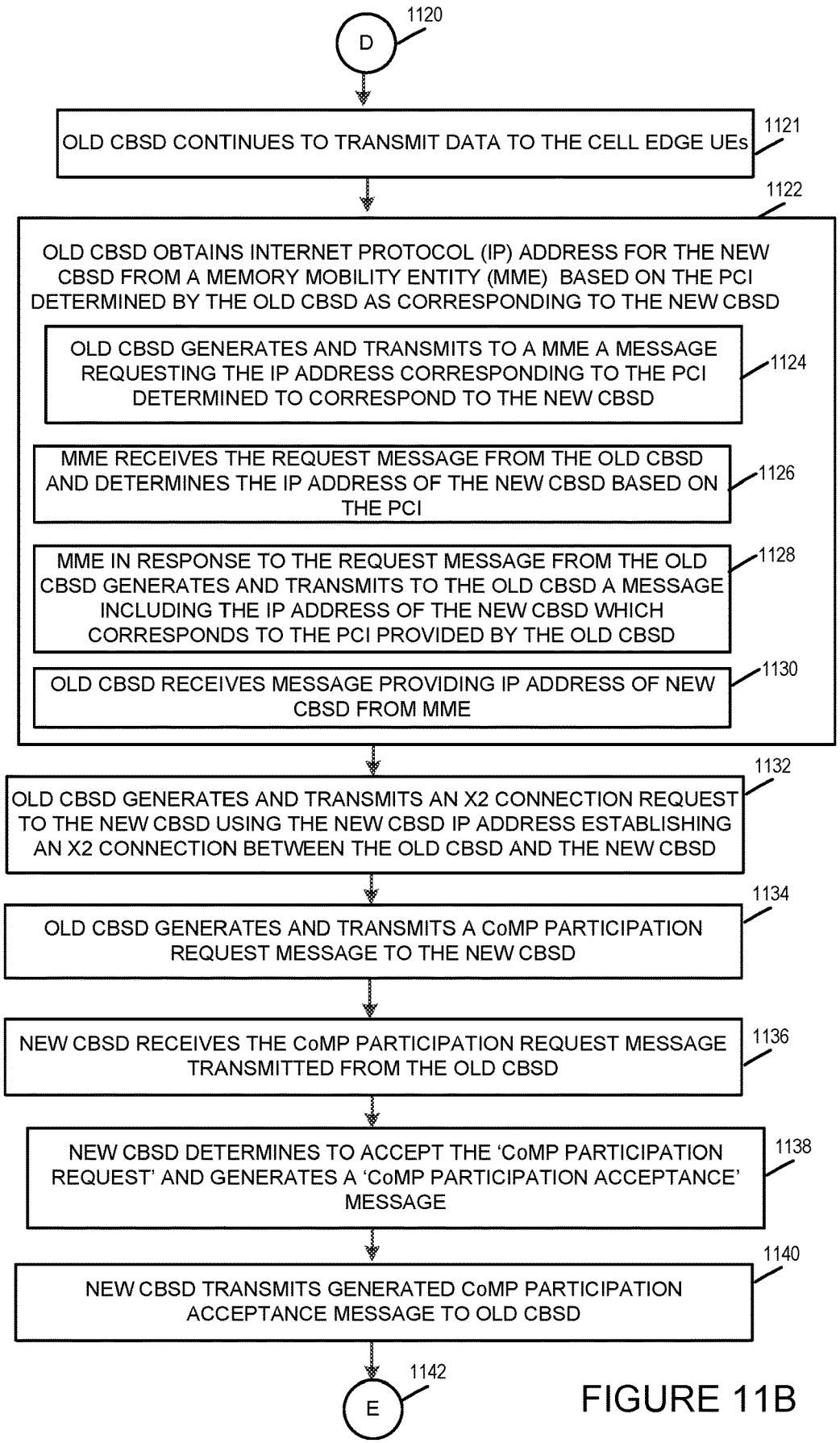
FIG. 11B illustrates the steps of the second part of an exemplary communications method in accordance with one embodiment of the present invention.
Figure 11C:
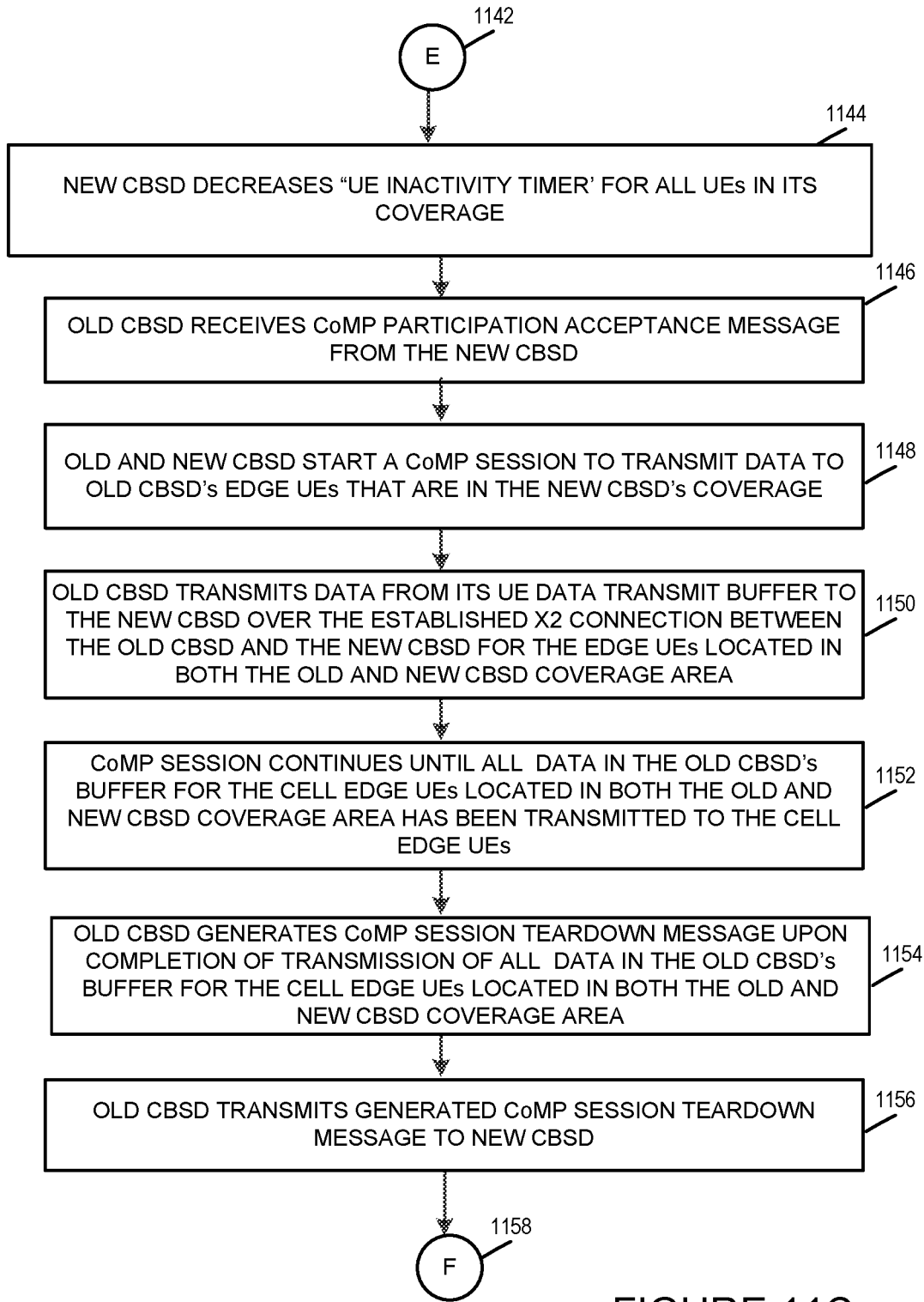
FIG. 11C illustrates the steps of the third part of an exemplary communications method in accordance with one embodiment of the present invention.

FIG. 11, which comprises the combination of FIGS. 11A, 11B, 11C and 11D illustrates another exemplary embodiment of the present invention. It illustrates a communications method 1100 including steps of a communications method for minimizing, reducing and/or eliminating service disruptions and/or service degradations for users when a CBSD is activated and begins transmitting in the geographical proximity of an existing currently active CBSD. FIG. 11A illustrates the steps of the first part of an exemplary method 1100 in accordance with one embodiment of the present invention. FIG. 11B illustrates the steps of the second part of an exemplary method 1100 in accordance with one embodiment of the present invention. FIG. 11C illustrates the steps of the third part of an exemplary method 1100 in accordance with one embodiment of the present invention. FIG. 11D illustrates the steps of the third part of an exemplary method 1100 in accordance with one embodiment of the present invention.

For explanatory purposes the exemplary method 1100 will be explained in connection with the exemplary communications system 100 illustrated in FIGS. 1, 2 and 3 although it should be understand that the method may be implemented using other systems and other system configurations then those illustrated in FIGS. 1, 2 and 3.

The method 1100 shown in FIG. 11 will now be discussed in detail. The method starts in start step 1102 shown on FIG. 11A with the devices in communications system 100 being initialized and becoming operational. CBSD 2 104 while operational is not in an active mode or state of operation, i.e., CBSD 2 104 is not communicating with any UE devices but may be, and in some embodiments is, in communication with the SAS 1 106. Over the air communications links or channels are established between UE 1 110, UE 2 112, UE 3 114, UE 4 116, and UE 5 118 over which packets of data are transmitted from the CBSD 1 102 to the UE devices in the cell 108. UE 6 120, UE 7 122, UE 8 124, UE 9 126 are not within the coverage area of CBSD 1 102 as shown by these devices being located outside the cell 108. Operation proceeds from start step 102 to step 104.

In step 104, each CBSD in the CBRS network determines/calculates the number of UEs in its coverage area for a pre-determined duration of time in the CBRS network. From this information each CBSD can determine and/or derive information on its current UE load. In some embodiments, each CBSD transmits this UE load information to a Spectrum Access System (SAS) managing the power levels of the CBSDs in its assigned CBRS network coverage area. The CBSDs can use this UE load information for managing UEs and determining how best to respond to a power down or power reduction command from a SAS taking into consideration the effect the power down command will have given the existing UE load on the CBSD at the time the power down command is to be implemented. With respect to communications system 100, the CBSD 1 102 is the only currently active CBSD in the CBRS network as CBSD 2 104 is not in an active state at time T1 as shown in FIG. 1. The CBSD 1 102 determines that there are 5 UEs (UE 1 110, UE 2 112, UE 3 114, UE 4 116 and UE 5 118) in its coverage area which is cell 108. SAS 1 106 of system 100 is the Spectrum Access System managing the electromagnetic interference caused by the CBSD 1 102 over the air transmission via controlling the transmit power levels of the CBSD 1 102 through control message sent to the CBSD 1 102 from the SAS 1 106. The data packets of various communications session, e.g., video sessions, being sent to and from the UE devices in the cell 108 are transmitted to outside communications networks or operator's IP services 158 via the serving gateway 154 and the PDN gateway 156. The CBSD 1 102 includes a data buffer, e.g., memory storage, in which messages sent to the UEs currently being supported by the CBSD 1 102 are stored as they are transmitted to each of the UEs to which they are destined. Operation proceeds from step 1104 to step 1106.

In step 1106, a new CBSD is created/activated, e.g., it begins transmitting to UEs in the CBRS network. With respect to communications system 100, CBSD 2 104 is the new CBSD which is turned on/activated and begins transmitting to the UEs in the CBRS network. In this example CBSD 2 begins transmitting to UE 6 120, UE 7 122, UE 8 124 and UE 9 126 over wireless communications links/channels 208, 210, 212 and 214 respectively. These UEs have attached themselves to the new CBSD (CBSD 2 104) which supports UEs in cell 202. UE 1 110 and UE 2 112 receives transmissions from CBSD 2 104 which include the physical cell identifier for CBSD 2 104 but they remain attached to and supported by CBSD 1 102 which is sometimes referred to in the method example 1100 as the old CBSD. Operation proceeds from step 1106 to step 1108.

In step 1108, the old CBSD, e.g., CBSD 1 102, receives, e.g., from SAS 1 106, a power down message indicating that its transmit power needs to be reduced. In response to the received power down command received by the old CBSD 1 102, the old CBSD 1 102 will begin transmitting in accordance with the new lower transmission power constraints. As a result the reduction in available power, the old CBSD (CBSD 1 102) will have difficulty communicating with devices at the edge of the cell 108 if communication with other UEs is maintained at the same rate as before the power down instruction was implemented. Operation proceeds from step 1108 to 1110.

In step 1110, the old CBSD (CBSD 1 102) determines the UEs on the edge of its cell coverage area and the UEs in its coverage area that are not on the cell edge, e.g., UEs that located in the cell center or cell middle. In the example of system 100, the user equipment devices UE 1 110 and UE 2 112 are edge cell UEs which are located on the edge of cell 108. The user equipment devices UE 3 114, UE 4 116, and UE 5 118 are user equipment devices which the CBSD 1 102 determines are not edge cell UEs. In some embodiments, step 1110 includes sub-step 1111. In sub-step 1111, the old CBSD (CBSD 1 102) determines whether each UE in its coverage area (cell 108) is an edge UE based on power headroom values and/or timing advance values reported to the old CBSD from each UE. For example, if a UE resorts a headroom value less than 3 than the UE is determined to an edge UE. Operation proceeds from step 1110 to step 1112.

In step 1112, the old CBSD (CBSD 1 102) to free up resources on a temporary basis to allow the old CBSD to complete transmission of packets in its transmit buffer for UEs at the cell edge before the old CBSD terminates transmission to the edge cell UEs due to the power down instruction, decreases the "UE Inactivity timer" in the UEs in its CBRS coverage area (i.e., located in cell 108) which it has determined are not cell edge UEs. Operation proceeds from step 1112 to step 1114.

UEs not on the cell edge are likely to be supported after the power down command has been implemented and the cell coverage is reduced. In this example, the UE inactivity timer for UE 3 114, UE 4 116 and UE 5 118 are decreased from a first length to a second length wherein the second length is less than the first length. The amount of reduction is determined at least in some embodiments based on the amount of power level transmission reduction required by the power down command received by the old CBSD from the SAS 1 106. By decreasing the inactivity timer for the non-cell edge UEs, these non-edge cell UEs will stay in Radio Resource Control (RRC) Idle mode for a longer time and thereby leave the old CBSD (CBSD 1 102) resources to be used for the cell edge UEs which in this example are UE 1 110 and UE 2 112. By transitioning the non-edge cell UEs into an idle state the transmission resources including power and/or bandwidth previously being used by these non-edge cell UEs is freed up for communicating remaining packets in the old CBSD's transmit buffer to UEs (UE 1 110 and UE 2 112) on the edge of cell 108 which are likely to be dropped after a brief period of time, e.g., a few seconds, due to the reduction in transmission power. While the CBSD may transmit to the cell edge UEs at a lower power level and thus potentially at a lower data rate to use a lower modulation order or level because of the reduction in the transmit power levels, the CBSD will still be able to empty its transmit buffer of packets directed to the UEs at the cell edge which were present at the time the power reduction instruction was received.

In step 1114, the old CBSD (CBSD 1 102) increases the "UE Inactivity timer" in the UEs it determined are the cell edge UEs (UE 1 110 and UE 1 112) thereby giving the UEs on the edge of the cell more of a chance to receive data from the old CBSD. By increasing the UE inactivity timer for UEs on the cell edge these UEs will stay for a shorter period of time in RRC Idle mode. The cell edge UEs UE 1 110 and UE 2 112 have there UE inactivity timer increased from a third length to a fourth length wherein the further length is greater than the third length. In embodiments were the old CBSD had the UE inactivity timer set to the same value for all UEs at the time that the power down instruction was received, the third length would be equal to the first length and the fourth length would greater than the first length. Operation proceeds from step 1114 to step 1115.

In step 1115, the old CBSD (CBSD 102) continues to transmit data from its transmit data buffer to the cell edge UEs (UE 1 110 and UE 2 112). Operation proceeds from step 1115 to step 1116.

In step 1116, the old CBSD requests UEs it is servicing to measure the strength of signals being received from all neighbor CBSDs and to report the strength of the received signal along with the corresponding physical cell identifier (PCI) of the CBSD from which the UE received the signal. In this example, the cell 108 edge UEs (UE 1 110 and UE 2 112) are also within the CBRS coverage range of the new CBSD (CBSD 2 104) cell 202 as shown in FIG. 2 and will receive and report the signal strength and PCI of the new CBSD to the old CBSD (CBSD 1 102). Operation proceeds from step 1116 to step 1118.

In step 1118, the old CBSD (CBSD 1 102), determines the PCI of the new CBSD (CBSD 2 104) by comparing all the PCIs reported by the UEs to the a list of PCIs in the old CBSD's memory and identifies the PCI of the new CBSD (CBSD 2 104) by identifying the PCI reported which is not included in the list of PCIs in its memory. Operation proceeds from step 1118 to step 1121 shown on FIG. 11B via connection node D 1120.

In step 1121, the old CBSD continues to transmit data to the cell edge UEs. Operation proceeds from step 1121 to step 1122.

In step 1122, the old CBSD obtains the Internet Protocol (IP) address for the new CBSD (CBSD 2 104) from a memory mobility entity (e.g., MME 152) based on the PCI determined by the old CBSD as corresponding to the new CBSD. In some embodiments, the step 1122 includes one or more of sub-steps 1124, 1126, 1128, and 1130.

In sub-step 1124, the old CBSD generates and transmits to the MME a message requesting the IP address corresponding to the PCI determined to correspond to the new CBSD. Operation proceeds from sub-step 1124 to sub-step 1126.

In sub-step 1126, the MME (e.g., MME 152 of system 100) receives the request message from the old CBSD and determines the IP address of the new CBSD based on the determined PCI provided in the request message. Operation proceeds from sub-step 1126 to sub-step 1128.

In step 1128, the MME in response to the request message from the old CBSD generates and transmits to the old CBSD a message including the IP address of the new CBSD which correspond to the PCI provided by the old CBSD. Operation proceeds from sub-step 1128 to sub-step 1130.

In sub-step 1130, the old CBSD receives the message providing the IP address of the new CBSD from the MME. Operation proceeds from step 1122 to step 1132.

In step 1132, the old CBSD generates and transmits an X2 connection request message to the new CBSD using the new CBSD IP address obtained from the MME. An X2 connection is established between the old CBSD (CBSD 1 102) and the new CBSD (CBSD 2 104), for example over communications link 128. Operation proceeds from step 1132 to step 1134.

In step 1134, the old CBSD (CBSD 1 102), generates and transmits a Coordinated Multipoint Participation (CoMP) Request message to the new CBSD (CBSD 2 104). Operation proceeds from step 1134 to step 1136.

In step 1136, the new CBSD (CBSD 2 104) receives the CoMP Participation Request message transmitted from the old CBSD (CBSD 1 102). Operation proceeds from step 1136 to step 1138.

In step 1138, the new CBSD (CBSD 2 104) determines to accept the CoMP Participation request and generates a CoMP participation acceptance message. Operation proceeds from step 1138 to step 1140.

In step 1140, the new CBSD (CBSD 2 104) transmits the generated CoMP participation acceptance message to the old CBSD (CBSD 1 102) over communications link 128. Operation proceeds from step 1140 via connection node E 1142 to step 1144 illustrated on Figure B.

In step 1144, new CBSD (CBSD 2 104) decreases the UE inactivity timer for all UEs in its CBRS coverage area which includes the UEs located in cell 202 and which are attached to and being serviced by the new CBSD (CBSD 2 104). These UEs include UE 6 120, UE 7 122, UE 8 124 and UE 9 126. By decreasing the UE inactivity timer for these UEs these UEs will stay in RRC idle mode for a longer period of time will not ask for data from the new CBSD (CBSD 2 104) thereby freeing up resources for use in communicating with the UEs that will be participating in the CoMP transmission which in this case are the cell edge UEs, UE 1 110 and UE 2 112 which are in the old CMSD coverage (cell 108). Operation proceeds from step 1144 to step 1146.

In step 1146, the old CBSD (CBSD 1 102) receives the CoMP participation acceptance message from the new CBSD (CBSD 2 104). Operation proceeds from step 1146 to step 1148.

In step 1148, the old and new CBSD start a CoMP session to transmit data to the old CBSD's cell edge UEs that are in the new CBSD's coverage area (cell 202) which are UE 1 110 and UE 2 112. Operation proceeds from step 1148 to step 1150.

In step 1150, the old CBSD (CBSD 1 102) transmits data from its UE data transmit buffer in downlink to the new CBSD over the established X2 connection between the old CBSD (CBSD 1 102) and the new CBSD (CBSD 2 104) for the cell edge UEs located in both the old and new CBSD coverage area which in this example are UE 1 110 and UE 2 112. Operation proceeds from step 1150 to step 1152.

In step 1152, the CoMP session continues until all data in the old CBSD's data transmit buffer for the cell edge UEs located in both the old and new CBSD coverage area has been transmitted to the cell edge UEs by the old and new CBSDs. With CoMP transmissions both the old and new CBSD devices simultaneously, at the same time and/or in parallel transmit information to the cell edge UEs (UE 1 110 and UE 2 112). The purpose of this is that since the coverage of the old CBSD is shrinking, the old CBSD will receive assistance from the new CBSD to transmit all the data that the cell edge UEs have requested and transmit all the information in the old CBSD's UE transmit buffer to these cell edge UEs so that these cell edge UEs will not experience service interruption by waiting for a new connection as part of a handover or will at least minimize or reduce the service interruption while waiting for a new connection or provide a graceful termination before the radio connection with the old CBSD is dropped if no handover is to be implemented. Operation proceeds from step 1152 to step 1154.

In step 1154, the old CBSD (CBSD 1 102) generates a CoMP session teardown message upon completion of transmission of all data in the old CBSD's transmit buffer to the cell edge UEs (UE 1 110 and UE 2 112) located in both the old and new CBSD CBRS coverage (cell 108 and cell 202 of FIG. 2). The data in the old CBSD's transmit buffer is the data that was in the buffer at the time it received the power down instruction. The old CBSD does not continue to place new data received from the serving gateway for the cell edge UEs in the new buffer once it determines that it coverage is shrinking so as to exclude the cell edge UEs. Operation proceeds from step 1154 to step 1156.

In step 1156 the old CBSD transmits the generated CoMP session teardown message to the new CBSD over the X2 connection. Operation proceeds from step 1156 to step 1160 shown on FIG. 11D via connection node F 1158.

In step 1160, the new CBSD (CBSD 2 104) receives the CoMP session teardown message from the old CBSD (CBSD 1 102). Operation proceeds from step 1160 to step 1162.

In step 1162, the new CBSD (CBSD 2 104) generate a CoMP session teardown acceptance message. Operation proceeds from step 1162 to step 1164.

In step 1164, the new CBSD (CBSD 2 104) transmits the generated CoMP session teardown acceptance message to the old CBSD (CBSD 1 102). Operation proceeds from step 1164 to step 1166.

In step 1166, the CoMP session is torn down/terminated. Operation proceeds from step 1166 to step 1168.

In step 1168, the old CBSD increases the UE Inactivity timer for all UEs remaining in its coverage area. In some embodiments, step 1168 includes sub-step 1170. In sub-step 1170, the old CBSD cell coverage is reduced with the cell edge UEs (UE 1 110 and UE 2 112) being dropped from coverage by the old CBSD as the old CBSD transmit power level has been reduced in accordance with the SAS 1 power down instruction and the old CBSD increases the UE inactivity timer for UEs remaining its shrunken cell (FIG. 3 cell 108') that had there inactivity timer previously increased. In this example, FIG. 3 cell 108' illustrates the old CBSD 2 (CBSD 1 102) shrunken CBRS coverage area in which UE 1 110 and UE 2 112 are no longer being serviced as they are outside of the cell 108' but UE 3 114, UE 4 116 and UE 5 116 continues to be services by the old CBSD (CBSD 1 102) as they are located in the cell 108'. Operation proceeds from step 1168 to step 1174.

In step 1174, the new CBSD (CBSD 2 104) increases the UE inactivity timer for UEs in its coverage area cell 202 that had there inactivity timer previously decreased. In some embodiments, UE 1 110 and UE 2 112 the cell edge UEs are handed off from old CBSD (CBSD 1 102) to the new CBSD (CBSD 2 104) after the completion of the CoMP transmission and thereafter serviced by the new CBSD. FIG. 3 illustrates system 100 at a time T3 after the completion of the CoMP transmission and powering down of the old CBSD and increasing UE inactivity timers. Operation proceeds from step 1174 via connection node 1176 to step 1104 illustrated on FIG. 11A wherein the process is repeated when a another CBSD is added to the CBRS system.

In some embodiments, the old CBSD does not perform steps 1122 to 1174 and does not setup a CoMP session but merely continues to transmit the data in its UE transmit buffer to the cell edge UEs until all the data has been transmitted to the cell edge UE devices at which time the old CBSD increases the UE Inactivity timer for UEs in its coverage area for which it previously decreased the UE Inactivity timer and drops the cell edge UEs due to the power reduction required by the power down command. While setting up the CoMP session provides an additional mechanism for transmitting the buffered data to the cell edge UEs, the new CBSD may not always be able to or willing to accept the CoMP request, in such instances the old CBSD can still continue to transmit to the cell edge UEs until it empties it transmit buffer while the non-edge cell UEs remain for a longer time in the idle state due to the decreased UE inactivity timer.

LIST OF SET OF EXEMPLARY NUMBERED METHOD EMBODIMENTS

Method Embodiment 1

A communications method including operating a first CBSD of a first cell, the method comprising: receiving a power down message at the first CBSD; decreasing, in response to the power down message, UE inactivity timer length for one or more UEs from a first length to a second length; and continuing to transmit packets to UEs at an edge of the first cell.

Method Embodiment 2

The method of method embodiment 1, further comprising: operating the first CBSD to group UEs being served by the first CBSD into a group of edge UEs and a group of cell center UEs, said grouping being based on an indicator of UE distance from the center of the cell, said indicator of UE distance from the center of the cell being one of Reference Signal Received power information or UE timing advance information.

Method Embodiment 3

The method of method embodiment 2, wherein said step of decreasing UE inactivity timer length is performed for UEs in said cell center group of UEs and is not performed for UEs in said group of edge UEs.

Method Embodiment 4

The method of claim 2, further comprising: receiving at said first CBSD RSRP (reference signal received power information) and corresponding PCI information from at least a first edge UE, said RSRP information providing information on at least one additional CBSD which can communicate with the first edge UE.

Method Embodiment 5

The method of claim 4, operating the first CBSD to establish a connection (e.g., X2 connection) with the additional CBSD.

Method Embodiment 6

The method of method embodiment 5, further comprising: operating the first CBSD to send a coordinated multipoint (CoMP) participation request message to the additional CBSD; operating the first CBSD to receive a CoMP request acceptance message indicating that the additional CBSD is willing to assist in the communication of packets; and operating the first CBSD to communicate a first set of packets in its transmit buffer to said additional CBSD via said communications link, said first set of packets being packets for transmission (e.g., to be transmitted) to the first edge UE as part of a CoMP session.

Method Embodiment 7

The method of method embodiment 6, further comprising: operating the additional CBSD to decrease, in response to the (CoMP) participation request message, UE inactivity timer length for one or more UEs connected to the additional CBSD (e.g., from a third length to a fourth length, said fourth length being shorter than said third length).

Method Embodiment 8

The method of method embodiment 6, further comprising: operating both the first CBSD and said additional CBSD to transmit the first set of packets over the air.

Method Embodiment 9

The method of method embodiment 8 further comprising: operating the first CBSD to terminate a wireless connection to the first edge UE after successful communication of said first set of packets to the first edge UE (after the packets in the first CBSDs transmit buffer at the time the power down message was received are successfully transmitted to the first UE, the first CBSD terminates its radio connection with the first edge UE thereby freeing up resources that were being used to communicate with the first edge UE).

Method Embodiment 10

The method of method embodiment 8, further comprising: increasing UE inactivity timer length for a second UE, following termination of a radio connection with the first edge UE, said second UE being one of the said one or more UEs for which the UE inactivity timer was decreased from the first length to the second length.

Method Embodiment 11

The method of method embodiment 10 wherein increasing the UE inactivity timer length for the second UE includes changing a length of a second UE inactivity timer from the second length to the first length, said first length being longer than said second length.

Method Embodiment 12

The method of claim 9, further comprising: completing a handoff of the first edge UE from the first CBSD to the additional CBSD.

LIST OF SET OF EXEMPLARY NUMBERED SYSTEM EMBODIMENTS

System Embodiment 1

A communications system comprising: a first CBSD of a first cell, the first CBSD including: a network receiver that receives a power down message; a first processor that controls the first CBSD to decrease, in response to the power down message, user equipment device (UE) inactivity timer length for one or more UEs from a first length to a second length; and a wireless transmitter that continues to transmit packets to UEs at an edge of the first cell.

System Embodiment 2

The communications system of system embodiment 1, wherein said first processor controls the operation of the first CBSD to group UEs being served by the first CBSD into a group of edge UEs and a group of cell center UEs, said grouping being based on an indicator of UE distance from the center of the cell, said indicator of UE distance from the center of the cell being one of Reference Signal Received Power (RSRP) information or UE timing advance information.

System Embodiment 3

The communications system of system embodiment 2, wherein said decrease in the UE inactivity timer length is performed for UEs in said cell center group of UEs and is not performed for UEs in said group of edge UEs.

System Embodiment 4

The communications system of system embodiment 2, further comprising: a wireless receiver that receives at said first CBSD said RSRP information and corresponding PCI information from at least a first edge UE, said RSRP information providing information on at least one additional CBSD which can communicate with the first edge UE.

System Embodiment 5

The communications system of claim 4, further comprising: an additional CBSD; and wherein said first processor further controls the first CBSD to establish a connection (e.g., X2 connection) with the additional CBSD.

System Embodiment 6

The communications system of system embodiment 5: wherein said first CBSD further includes a transmit buffer; and wherein said first processor further controls the first CBSD to: send a coordinated multipoint participation (CoMP) request message to the additional CBSD; receive a CoMP request acceptance message indicating that the additional CBSD is willing to assist in the communication of packets; and communicate a first set of packets in its transmit buffer to said additional CBSD via said communications link, said first set of packets being packets for transmission (e.g., to be transmitted) to the first edge UE as part of a CoMP session.

System Embodiment 7

The communications system of system embodiment 6, wherein said first processor controls the first CBSD to transmit the first set of packets over the air; and wherein said second processor controls the additional CBSD to transmit the first set of packets over the air in parallel with transmission of the first set of packets over the air by the first CBSD.

System Embodiment 8

The communications system of system embodiment 7 wherein the first processor controls the first CBSD to terminate a wireless connection to the first edge UE after successful communication of said first set of packets to the first edge UE (after the packets in the first CBSDs transmit buffer at the time the power down message was received are successfully transmitted to the first UE, the first CBSD terminates its radio connection with the first edge UE thereby freeing up resources that were being used to communicate with the first edge UE).

System Embodiment 9

The communications system of system embodiment 8, wherein said first processor controls the first CBSD to increase UE inactivity timer length for a second UE, following termination of a radio connection with the first edge UE, said second UE being one of the said one or more UEs for which the UE inactivity timer was decreased from the first length to the second length.

System Embodiment 10

The communications system of system embodiment 9 wherein said to increase the UE inactivity timer length for the second UE includes changing a length of a second UE inactivity timer from the second length to the first length, said first length being longer than said second length.

System Embodiment 11

The communications system of system embodiment 8, wherein said first processor controls the first CBSD to complete a handoff of the first edge UE from the first CBSD to the additional CBSD.

System Embodiment 12

The communications system of system embodiment 6, wherein the additional CBSD includes a second processor that controls the additional CBSD to decrease, in response to the (CoMP) participation request message, UE inactivity timer length for one or more UEs connected to the additional CBSD (e.g., from a third length to a fourth length, said fourth length being shorter than said third length).

LIST OF SET OF EXEMPLARY NUMBERED COMPUTER READABLE MEDIUM EMBODIMENTS

Computer Readable Medium Embodiment 1

A non-transitory computer readable medium including a first set of computer executable instructions which when executed by a processor of a Citizens Broadband Radio Service Device (CBSD) device of a first cell cause the CBSD device to perform the steps of: receiving a power down message at the first CBSD; decreasing, in response to the power down message, (user equipment device) UE inactivity timer length for one or more UEs from a first length to a second length; and continuing to transmit packets to UEs at an edge of the first cell.

The techniques of various embodiments may be implemented using software, hardware and/or a combination of software and hardware. Various embodiments are directed to apparatus, e.g., CBSD, user equipment devices, SAS, Serving Gateway, PDN gateway, servers, mobility management entities, network nodes, and/or network equipment devices. Various embodiments are also directed to methods, e.g., method of controlling and/or operating CBSD devices, network nodes, SAS, nodes, servers, user equipment devices, controllers, mobility management entities or network equipment devices. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order, and are not meant to be limited to the specific order or hierarchy presented. In some embodiments, one or more processors are used to carry out one or more steps of the each of the described methods.

In various embodiments each of the steps or elements of a method are implemented using one or more processors. In some embodiments, each of the elements or steps are implemented using hardware circuitry.

In various embodiments devices, servers, nodes and/or elements described herein are implemented using one or more components to perform the steps corresponding to one or more methods, for example, message reception, signal processing, sending, comparing, determining and/or transmission steps. Thus, in some embodiments various features are implemented using components or in some embodiments logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more devices, servers, nodes and/or elements. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a controller, including a processor configured to implement one, multiple or all of the steps of one or more methods of the invention.

In some embodiments, the processor or processors, e.g., CPUs, of one or more devices, e.g., communications nodes such as CBSD, UEs, SAS, MME are configured to perform the steps of the methods described as being performed by the CBSD, UEs, SAS, or MME. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., CBSD, UE, SAS, MME, with a processor which includes a component corresponding to each of the steps of the various described methods performed by the device in which the processor is included. In some but not all embodiments a device, e.g., CBSD, UE, SAS, MME, includes a controller corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a CBSD, UE, SAS, MME. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device such as a CBSD, UE or other device described in the present application.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A communications method including operating a first Citizens Broadband Radio Service Device (CBSD) of a first cell, the method comprising:
receiving a power down message at the first CBSD;
receiving, at said first CBSD, Reference Signal Received Power (RSRP) information and corresponding physical cell identity (PCI) information from at least a first edge user equipment device (UE), said RSRP information providing information on at least one additional CBSD which can communicate with the first edge UE;
operating the first CBSD to group UEs being served by the first CBSD into a group of edge UEs and a group of cell center UEs, said groupings being based on an indicator of UE distance from a center of the cell, said indicator of UE distance from the center of the cell being one of Reference Signal Received Power (RSRP) information or UE timing advance information;
operating the first CBSD to decrease, in response to the power down message, user equipment device (UE) inactivity timer length for one or more user equipment devices (UEs) from a first length to a second length, said step of decreasing UE inactivity timer length is performed for UEs in said group of cell center UEs and is not performed for UEs in said group of edge UEs; and
operating the first CBSD to continue to transmit packets to UEs at an edge of the first cell;
operating the first CBSD to establish a connection with an additional CBSD, said additional CBSD being one of the at least one additional CBSD which can communicate with the first edge UE;
operating the first CBSD to send a coordinated multipoint participation (CoMP) request message to the additional CBSD;
operating the first CBSD to receive a CoMP request acceptance message indicating that the additional CBSD is willing to assist in the communication of packets; and
operating the first CBSD to communicate a first set of packets in its transmit buffer to said additional CBSD via said established connection, said first set of packets being packets for transmission to the first edge UE as part of a CoMP session.

2. The method of claim 1, further comprising:
operating both the first CBSD and said additional CBSD to transmit the first set of packets over the air.

3. The communications method of claim 1, wherein said power down message is received by the first CBSD from a Spectrum Access System.

4. The communications method of claim 1, wherein said indicator of UE distance from the center of the cell being one of Reference Signal Received Power (RSRP) information or UE timing advance information is UE timing advance information.

5. The communications method of claim 1, wherein said indicator of UE distance from the center of the cell being one of Reference Signal Received Power (RSRP) information or UE timing advance information is Reference Signal Received Power information.

6. The communications method of claim 1, wherein the connection established with the additional CBSD is an X2 connection.

7. The communications method of claim 1, further comprising:
operating the first CBSD to send requests to UEs in the first cell to: (i) measure signal strength of signals being received from other CBSDs by the UEs, and (ii) report to the first CBSD the measured signal strength and physical cell identifier (PCI) of the other CSBDs from which signals were received by the UEs, said additional CBSD being one of the other CBSDs.

8. The method of claim 2 further comprising:
operating the first CBSD to terminate a wireless connection to the first edge UE after successful communication of said first set of packets to the first edge UE.

9. The method of claim 8, further comprising:
increasing UE inactivity timer length for a second UE, following termination of a radio connection with the first edge UE, said second UE being one of the one or more UEs for which the UE inactivity timer was decreased from the first length to the second length.

10. The method of claim 8, further comprising:
completing a handoff of the first edge UE from the first CBSD to the additional CBSD.

11. A communications system comprising:
a first Citizens Broadband Radio Service Device (CBSD) of a first cell, the first CBSD including:
a network receiver that receives a power down message;
a wireless receiver that receives, at said first CBSD, Reference Signal Received Power (RSRP) information and corresponding physical cell identity (PCI) information from at least a first edge user equipment device (UE), said RSRP information providing information on at least one additional CBSD which can communicate with the first edge UE;
a first processor that controls the first CBSD to:
group UEs being served by the first CBSD into a group of edge UEs and a group of cell center UEs, said groupings being based on an indicator of UE distance from a center of the cell, said indicator of UE distance from the center of the cell being one of Reference Signal Received Power (RSRP) information or UE timing advance information;
decrease, in response to the power down message, user equipment device (UE) inactivity timer length for one or more UEs from a first length to a second length, wherein said decrease in the UE inactivity timer length is performed for UEs in said group of cell center UEs and is not performed for UEs in said group of edge UEs; and
a wireless transmitter that continues to transmit packets to UEs at an edge of the first cell; and
an additional CBSD, said additional CBSD being one of said at least one additional CBSD; and
wherein said first processor further controls the first CBSD to establish a connection with the additional CBSD;
wherein said first CBSD further includes a transmit buffer; and
wherein said first processor further controls the first CBSD to:
send a coordinated multipoint (CoMP) participation request message to the additional CBSD;
receive a CoMP request acceptance message indicating that the additional CBSD is willing to assist in the communication of packets; and
communicate a first set of packets in its transmit buffer to said additional CBSD via said established connection, said first set of packets being packets for transmission to the first edge UE as part of a CoMP session.

12. The communications system of claim 11,
wherein said first processor controls the first CBSD to transmit the first set of packets over the air; and
wherein the additional CBSD includes a second processor that controls the additional CBSD to transmit the first set of packets over the air in parallel with transmission of the first set of packets over the air by the first CBSD.

13. The communications system of claim 11, wherein said power down message is received by the first CBSD from a Spectrum Access System.

14. The communications system of claim 12 wherein the first processor controls the first CBSD to terminate a wireless connection to the first edge UE after successful communication of said first set of packets to the first edge UE.

15. The communications system of claim 14, wherein said first processor controls the first CBSD to increase UE inactivity timer length for a second UE, following termination of a radio connection with the first edge UE, said second UE being one of the one or more UEs for which the UE inactivity timer was decreased from the first length to the second length.

16. The communications system of claim 15, wherein said first processor controls the first CBSD to complete a handoff of the first edge UE from the first CBSD to the additional CSBD.

17. A non-transitory computer readable medium including a first set of computer executable instructions which when executed by a processor of a first Citizens Broadband Radio Service Device (CBSD) of a first cell cause the first CBSD to:
  receive a power down message at the first CBSD;
  receive, at said first CBSD, Reference Signal Received Power (RSRP) information and corresponding physical cell identity (PCI) information from at least a first edge user equipment device (UE), said RSRP information providing information on at least one additional CBSD which can communicate with the first edge UE;
  group UEs being served by the first CBSD into a group of edge UEs and a group of cell center UEs, said groupings being based on an indicator of UE distance from a center of the cell, said indicator of UE distance from the center of the cell being one of Reference Signal Received Power (RSRP) information or UE timing advance information;
  decrease, in response to the power down message, UE inactivity timer length for one or more UEs from a first length to a second length, said decreasing UE inactivity timer length is performed for UEs in said group of cell center UEs and is not performed for UEs in said group of edge UEs;
  continue to transmit packets to UEs at an edge of the first cell;
  establish a connection with an additional CBSD, said additional CBSD being one of the at least one additional CBSD which can communicate with the first edge UE;
  send a coordinated multipoint participation (CoMP) request message to the additional CBSD;
  receive a CoMP request acceptance message indicating that the additional CBSD is willing to assist in the communication of packets; and
  communicate a first set of packets in its transmit buffer to said additional CBSD via said established connection, said first set of packets being packets for transmission to the first edge UE as part of a CoMP session.

18. The non-transitory computer readable medium of claim 17, wherein the first set of computer executable instructions which when executed by the processor of the first Citizens Broadband Radio Service Device (CBSD) of the first cell further cause the first CBSD to:
  terminate a wireless connection to the first edge UE after successful communication of said first set of packets to the first edge UE.

19. The non-transitory computer readable medium of claim 17, wherein the first set of computer executable instructions which when executed by the processor of the first Citizens Broadband Radio Service Device (CBSD) of the first cell further cause the first CBSD to: increase UE inactivity timer length for a second UE, following termination of a radio connection with the first edge UE, said second UE being one of the one or more UEs for which the UE inactivity timer was decreased from the first length to the second length.

20. The non-transitory computer readable medium of claim 17, wherein the first set of computer executable instructions which when executed by the processor of the first Citizens Broadband Radio Service Device (CBSD) of the first cell further cause the first CBSD to: complete a handoff of the first edge UE from the first CBSD to the additional CBSD.

* * * * *